United States Patent [19]
Moriyama

[11] Patent Number: 5,995,552
[45] Date of Patent: Nov. 30, 1999

[54] RADIO EQUIPMENT AND PERIPHERAL APPARATUS

[75] Inventor: Yukihiro Moriyama, Kawasaki, Japan

[73] Assignee: Fujitsu Limited, Kanagawa, Japan

[21] Appl. No.: 08/564,902

[22] Filed: Nov. 29, 1995

[30] Foreign Application Priority Data

May 2, 1995 [JP] Japan ..................................... 7-108595

[51] Int. Cl.⁶ ............................... H03K 7/06; H03K 9/06
[52] U.S. Cl. .......................... 375/271; 375/278; 375/284; 375/296
[58] Field of Search ..................................... 375/271, 278, 375/284, 295, 296, 3.2, 219, 223, 346, 326, 329, 334

[56] References Cited

U.S. PATENT DOCUMENTS

| | | | |
|---|---|---|---|
| 5,008,903 | 4/1991 | Betts et al. | 375/296 |
| 5,263,055 | 11/1993 | Cahill | 375/346 |
| 5,377,232 | 12/1994 | Davidov et al. | 375/326 |
| 5,442,664 | 8/1995 | Rust et al. | 375/371 |

FOREIGN PATENT DOCUMENTS

| | | |
|---|---|---|
| 56-6556 | 1/1981 | Japan . |
| 3-254551 | 11/1991 | Japan . |
| 3-255510 | 11/1991 | Japan . |
| 5-90987 | 4/1993 | Japan . |

*Primary Examiner*—Don N. Vo
*Attorney, Agent, or Firm*—Helfgott & Karas, PC.

[57] ABSTRACT

Radio equipment for communicating digital data includes a clock modulation part for angular-modulation of a clock signal by a given modulation signal; and a data processing part processing the digital data based on the clock signal angular-modulated in the clock modulation part and producing angular-modulated digital data. In the radio equipment, levels of harmonics generated from the clock signal and the digital data are reducible.

19 Claims, 18 Drawing Sheets

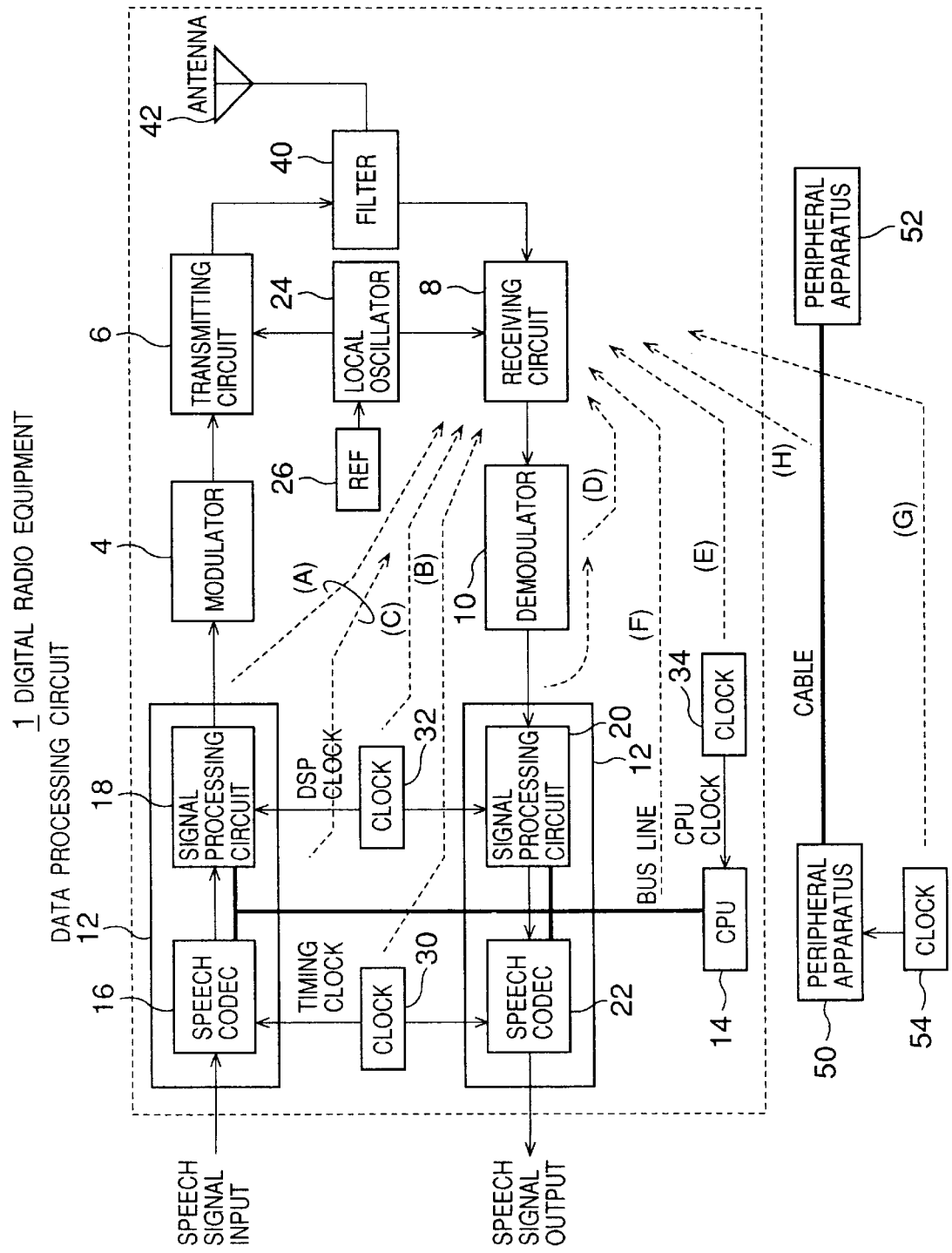

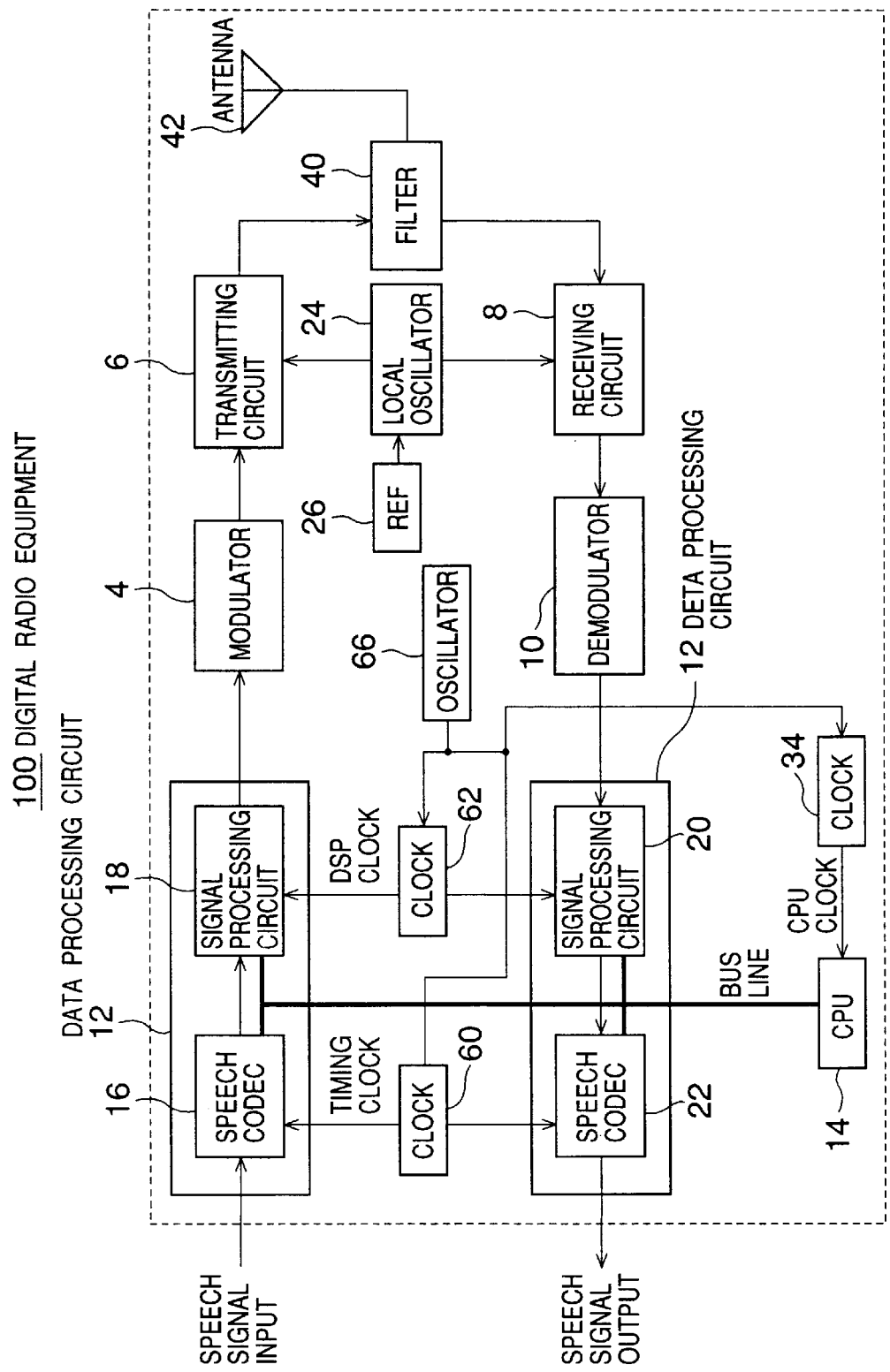

FREQ.

FREQ.

RADIO EQUIPMENT AND PERIPHERAL APPARATUS

BACKGROUND OF THE INVENTION

1. Field of the Invention

The present invention generally relates to radio equipment for transmitting a digital signal and its peripheral apparatus, and more particularly, to radio equipment and its peripheral apparatus for suppressing interference to a radio signal which is generated by the digital signal.

2. Description of the Related Art

Recently, a variety of radio communication systems such as a portable telephone service system are developing and a wide range of radio frequencies are used for the systems. For such a system using a wide range of radio frequencies, a digital modulation method capable of achieving higher usage efficiency of the frequencies is being used instead of an analog modulation method. For example, portable telephone service systems operating at the 800-MHz band and 1.5-GHz band are already in commercial use by the digital modulation method of π/4-shifted quadrature phase shift keying (QPSK).

Further, transmission rate and processing speed of the digital signal also increase according to development of LSI technologies. Therefore, frequencies of a timing clock of the digital signal and a clock for processing the digital signal increases close to a carrier frequency for radio transmission.

Since the digital signal and the clock signal are formed by rectangular waves, these signals have a number of high-order harmonic components. Frequencies of the harmonic components are spread to UHF and VHF bands. Therefore, when the frequencies of the harmonic components are present in a receiving frequency band of a radio signal, the harmonic components enter a receiving circuit of radio equipment as interference and have influence on a desired signal. The harmonic components are obtained by Fourier-expanding a digital signal k(t) as follows:

$$k(t) = A/2$$
$$\{1 + (4/\pi)[\cos\omega_o t - (1/3)\cos3\omega_o t + (1/5)\cos5\omega_o t - (1/7)\cos7\omega_o t \cdots ]\}$$

According to the above equation, the harmonic components have odd-order frequency components.

In general, to miniaturize size of the radio equipment, radio parts and digital signal processing parts are arranged close to each other in the same housing. To improve transmission quality and to reduce power consumption, a highly-sensitive receiver has also been developed. Therefore, in such a configuration, the above-mentioned interference due to harmonics may cause a larger problem.

In Japanese Laid-Open Patent Applications No.3-255510 and No.5-90987, methods of frequency-modulating a clock signal of a clock oscillator for a control circuit such as a CPU are disclosed. By the frequency modulation, the spectrum of harmonics of the clock signal is spread, and levels of high-order harmonics may be reduced. Therefore, interference to a receiving circuit may also be reduced. More specifically, Japanese Laid-Open Patent Application No.5-90987 shows an embodiment in which the above-mentioned method is applied to radio equipment using an analog modulation and demodulation method.

However, in radio equipment using a digital modulation and demodulation method, a digital signal such as transmission data as well as the clock oscillator of the control circuit also generates high-order harmonics. When increasing frequency deviation of the modulation of the clock signal in the control circuit to further reduce the level of the harmonics of the clock signal, an error may occur in an operation of the control circuit. Furthermore, the clock frequency is increasing, and the high-order harmonics may easily have influence on the radio signal.

FIG. 1 shows a block diagram of typical digital radio equipment. The equipment 1 shown in FIG. 1 includes a transmission part and a reception part. The transmission part comprises a data processing circuit 2, a modulator 4, and a transmitting circuit 6. The reception part comprises a receiving circuit 8, a demodulator 10, and a data processing circuit 12. The data processing circuit 2 includes a speech CODEC 16 and a signal processing circuit 18. The data processing circuit 12 includes a signal processing circuit 20 and a speech CODEC 22.

In the speech CODEC 16, a speech signal is converted to digital data based on a timing clock from a clock oscillator 30. In the signal processing circuit 18, the digital data is formatted in a format suitable for being transmitted. For example, when the radio equipment 1 operates in a time division multiple (TDM) system, the digital data is distributed to TDM frames. When the modulation method is QPSK, the digital data is separated to an I (in-phase) channel signal and a Q (quadrature phase) channel signal.

In the modulator 4, the digital data processed in the signal processing circuit 18 is filtered, and a first local signal is digitally modulated by the filtered digital data. For the digital modulation, phase modulation such as QPSK and frequency modulation such as GMSK are usable. An output signal of the modulator 4 is converted to a radio signal by the transmitting circuit 6, and is transmitted through a filter 40 to an antenna 42.

A radio signal which has come through the antenna 42 and the filter 40 is received in the receiving circuit 8, and is converted to an intermediate frequency signal. The intermediate frequency signal is demodulated in the demodulator 10 to reproduce digital data at a baseband frequency. The reproduced digital data is processed to digital data including a timing clock for the speech CODEC 22 in the signal processing circuit 20, and is converted to a speech signal in the speech CODEC 22.

The speech CODECs 16, 22 and the signal processing circuits 18, 20 may be commonly constructed with a digital signal processor (DSP). Timing clocks from the clock oscillator 30 are provided to the speech CODECs 16, 22, and DSP clocks from the clock oscillator 32 are provided to the signal processing circuits 18, 20. The speech CODECs 16, 22 and the signal processing circuits 18, 20 are connected to CPU 14 operable with a CPU clock provided from a clock oscillator 34 through a bus line.

In such a circuit configuration, the digital data is generated based on the timing clock for the speech CODEC and is formed by the rectangular waves. Therefore, the digital data includes a number of high-order harmonic components. When a frequency of one of the high-order harmonic components is close to the radio channel frequency, the harmonic component shown in a dotted line (A) may cause interference during operation of the receiving circuit 8.

The clock oscillators 30, 32 which generate the timing clock and the DSP clock for generating and processing the digital data have respectively high-frequency clock sources. Therefore, the high-frequency clock sources also generate high-order harmonic components which influence the receiving circuit 8. The interference is shown in dotted lines (B) and (C).

Further, the demodulator 10 commonly has a clock recovery circuit for recovering a timing clock to reproduce the baseband signal. Therefore, the clock recovery circuit and the reproduced baseband signal also generate high-order harmonic components which influence the receiving circuit 8. The interference is shown in a dotted line (D).

The CPU clock operating the CPU 14 and input and output data flowing through the bus line also generate high-order harmonic components which may cause interference. The interference is shown in dotted lines (E) and (F).

Still further, peripheral apparatuses such as a personal computer, a facsimile, a television, a radio, and a global positioning system (GPS), which are located close to the digital radio equipment 1, also have many clock oscillators. Therefore, harmonics are generated from those clock oscillators and harmonics are also generated from digital signals transmitting through cables which connect the peripheral apparatuses. These harmonics also influence the receiving circuit 8 of the digital radio equipment 1 as interference is shown in dotted lines (G) and (H).

Next, a detail description will be given of the interference by the timing clock generated in clock oscillator 30.

For example, when a bit rate of the timing clock is 11.2 kbps, the clock oscillator 30 has a 2.688-MHz clock source, and a signal divided by 24 is used as the timing clock. In this case, a 163-order harmonic of an output of the 2.688-MHz clock source is a 438.144-MHz signal. If a radio channel is used at a frequency of 438.150 MHz, the harmonic frequency is close to the radio channel frequency. The harmonic may interfere with the radio channel being received.

FIG. 2A and FIG. 2B show signal space diagrams when a QPSK signal is received with interference. FIG. 2A shows the signal space diagram at an instant of time, and FIG. 2B shows the signal space diagram averaged over a given time period. When the high-order harmonic component of the clock is added to an ideal QPSK signal, as shown in FIG. 2A, four ideal signal points of the QPSK signal are shifted by interference in the same direction. However, the shifted direction rotates about each signal point according to a frequency difference between the radio channel and the interference (in the previous example, 6 kHz). As a result, as shown in FIG. 2B, in averaging over the given time period, the four ideal signal points respectively spread in a circle form. The interference becomes a bright-line interference. When a size of the circle exceeds a decision level, an error occurs.

As mentioned above, in conventional digital radio equipment, since the data is formed by the digitally-shaped clock, the harmonics are generated from the digital data and the clock. Namely, the interference which did not occur in analog radio equipment is newly generated for the receiving circuit in digital radio equipment.

Further, for improving frequency utility and services, the data transmission speed needs to be increased. For this requirement, the clock sources of the clock oscillator for generating the timing clock and the DSP oscillator for processing the digital data tends to have a higher frequency. On the other hand, in a relatively low radio frequency, the digital modulation and demodulation methods are being used. Therefore, a level of interference due to the harmonics of the clock used for the digital data increases, and the interference may strongly influence the radio receiving circuit.

SUMMARY OF THE INVENTION

It is an object of the present invention to provide radio equipment and its peripheral apparatus in which harmonics generated by a digital signal are reduced and interference with a radio receiving circuit are also reduced. This permits the disadvantages described above to be eliminated.

The object described above is achieved by radio equipment for communicating digital data comprising: a clock modulation part for angular-modulation of a clock signal by a given modulation signal; and a data processing part processing the digital data based on the clock signal angular-modulated in the clock modulation part and producing angular-modulated digital data; wherein levels of harmonics generated from the clock signal and the digital data are reducible.

According to the above-mentioned radio equipment, the clock processing the digital data is angular-modulated and the spectrum of harmonics of the clock is spread. Therefore, the level of the harmonics is reduced and the interference due to the harmonics is prevented from influencing a radio receiving circuit in the radio equipment and external radio equipment.

The object described above is also achieved by radio equipment for communicating digital data comprising: a reception part for receiving a radio signal; a demodulation part demodulating the radio signal from the reception part and producing digital data; a clock recovery part for recovering a recovered clock in relation to the digital data from the demodulation part; and a recovered-clock modulation part angular-modulation of the recovered clock from the clock recovery part by a given modulation signal; wherein levels of harmonics generated from the recovered clock signal and the clock recovery part are reducible.

According to the above-mentioned radio equipment, the recovered clock is angular-modulated and the spectrum of harmonics of the recovered clock is spread. Therefore, the level of the harmonics is reduced and the interference due to the harmonics of the recovered clock is prevented from having an influence on a radio receiving circuit in the radio equipment and external radio equipment.

The object described above is also achieved by a clock modulation module comprising: a clock modulation part for angular-modulation of a clock signal by a given modulation signal; and a data processing part processing digital data for radio communication based on the clock signal angular-modulated in the clock modulation part, and producing angular-modulated digital data; wherein levels of harmonics generated from the clock signal and the digital data are reducible.

According to the above-mentioned clock modulation module, the clock for processing the digital data is angular-modulated and the spectrum of harmonics of the clock is spread. Therefore, the level of the harmonics is reduced and the interference due to the harmonics of the clock is prevented from having an influence on an apparatus located close to the clock modulation module.

The object described above is also achieved by radio equipment for receiving a radio signal modulated by angular-modulated digital data, the radio equipment comprising: a reception part receiving the radio signal; a demodulation part demodulating the radio signal in synchronization with frequency and phase variation of the angular-modulated digital data so as to produce digital data in which an angular modulation component is avoided.

According to the above-mentioned radio equipment, the angular-modulated digital data is demodulated in synchronization with frequency and phase variation of the angular-modulated digital data. Therefore, the angular-modulated digital data is properly demodulated without being influenced by the angular modulation.

The object described above is also achieved by the radio equipment mentioned above, wherein the radio equipment further comprises an interference detection part detecting interference to a received signal, and operation of the clock modulation part is based on an output of the interference detection part.

According to the above-mentioned radio equipment, when no interference is detected, the clock is not modulated. Therefore, at this time, the modulation of the clock is prevented from having an influence on other circuits.

The object described above is also achieved by the radio equipment mentioned above, wherein the radio equipment further comprises an interference channel table which stored receiving channels which are subjected to interference by harmonics generated in the radio equipment, and the clock modulation part operates when one of the receiving channels stored in the interference channel table is used.

According to the above-mentioned radio equipment, when a signal is received on the receiving channel which is not subjected to interference created by the harmonics of the clock, the clock is not modulated. Therefore, at this time, the modulation of the clock is prevented from having an influence on other circuits.

The object described above is also achieved by the radio equipment mentioned above, wherein the clock modulation part operates only during reception of a radio signal.

According to the above-mentioned radio equipment, when no signal is received, the clock is not modulated. Therefore, at this time, the modulation of the clock is prevented from having an influence on other circuits.

The object described above is also achieved by the radio equipment mentioned above, wherein the radio equipment further comprises a signal processing part which communicates the digital data by use of a time division multiple, a time interval of a time division frame given by integral multiples of a period of the given modulation signal for angular-modulation of the clock signal in the clock modulation part.

According to the above-mentioned radio equipment, the time interval of the time division frame is given by integral multiples of the period of the given modulation signal. No portion of the digital data in the frame is out of the frame and the amount of the transmission data in one frame is maintained. Therefore, influence due to the modulation of the digital data may be reduced.

The object described above is also achieved by an apparatus comprising: a control circuit processing data based on a clock signal; a transmission line transmitting angular-modulated data; and a modulation-component avoiding part, connected to the transmission line, to avoid a modulation component from the angular-modulated data from the control circuit so as to produce data in which the modulation component is avoided; wherein levels of harmonics generated from the angular-modulated data from the transmission line is reducible.

According to the above-mentioned apparatus, the data from the control circuit is angular-modulated by the given modulation signal, and the data is provided to other circuits after the modulation component in the data is avoided. Therefore, the level of the harmonics of the clock signal passing through the transmission line may be reduced, and the modulation of the data is prevented from having an influence on other circuits. More specifically, when the apparatus includes the radio equipment, the harmonic generated from the transmission line is prevented from influencing the receiving circuit.

The object described above is also achieved by an apparatus comprising a modulation-component avoiding part avoiding a modulation component from angular-modulated data transmitted from a first apparatus through a transmission line, and producing data in which the modulation component is avoided.

According to the above-mentioned apparatus, after the modulation component in the angular-modulated data coming from the first apparatus through the transmission line is avoided, the data is provided to other circuits. Therefore, the level of the harmonics of the angular-modulated data may be reduced, and the modulation of the data is prevented from having an influence on other circuit processing.

The object described above is also achieved by radio equipment for communicating digital data comprising: a clock oscillator generating a clock signal; and a carrier generation part generating a carrier based on a reference signal; wherein frequency of the reference signal is given by integral multiples of frequency of the clock signal.

According to the above-mentioned radio equipment, when the frequency of the reference signal is given by integral multiples of the frequency of the clock signal, frequency of higher-order harmonic of the clock signal may be identical to one of the carriers. In this case, interference due to the harmonic may be removed by demodulation using an offset control.

The object described above is also achieved by an apparatus positioned adjacent to radio equipment, comprising: a reference signal receiving part receiving a reference from the radio equipment for generating a carrier; and a control circuit operating based on the reference signal.

The object described above is also achieved by radio equipment positioned adjacent to a peripheral apparatus, comprising: a clock signal receiving part receiving a clock signal from the peripheral apparatus; and a carrier generation circuit generating a carrier based on the clock signal received from the peripheral apparatus through the clock signal receiving part.

According to the above-mentioned apparatus, the reference signal in the radio equipment is used as a clock of the control circuit. According to the above-mentioned radio equipment, the clock signal in the peripheral apparatus is used as the reference signal for generating the carrier. Therefore, the frequency of the harmonic generated from the control circuit in the apparatus may be identical to the frequency of the receive carrier of the radio equipment. In this case, interference to the receiving circuit due to the harmonic may be removed by demodulation using the offset control.

The object described above is also achieved by radio equipment comprising a reference signal connection part connecting, to a peripheral apparatus, at least one of a reference signal for generating a carrier and signals given by dividing the reference signal.

According to the above-mentioned radio equipment, the reference signal of the radio equipment may be easily provided to the peripheral apparatus.

The object described above is also achieved by radio equipment for receiving a signal modulated by digital data comprising: a reception part receiving the signal; a demodulation part demodulating the signal to produce digital data, the demodulation part comprising a carrier recovery part recovering a carrier from the signal; and a clock oscillator generating a clock signal; wherein frequency of a recovered carrier from the demodulation part is given by integral multiples of frequency of the clock signal.

According to the above-mentioned radio equipment, the frequency of the higher-order harmonic of the clock signal may be identical to one of the carrier frequencies. Therefore, the higher-order harmonic of the clock signal may have the same phase as that of the reference signal for detection. In this case, interference due to the harmonic may be removed by demodulation using the offset control.

The object described above is also achieved by an apparatus positioned adjacent to radio equipment, comprising: a recovered-carrier receiving part receiving a recovered carrier recovered from a received signal in the radio equipment; and a control circuit operating based on the recovered carrier.

According to the above-mentioned apparatus, the recovered carrier in the radio equipment is used as a clock of the control circuit in the apparatus. Therefore, the frequency of the harmonic generated from the control circuit in the apparatus may be identical to one of the carrier frequencies in the radio equipment. Therefore, the higher-order harmonic of the clock signal may have the same phase as that of the reference signal for detection. In this case, interference to the receiving circuit in the radio equipment due to the harmonic may be removed by demodulation using the offset control.

The object described above is also achieved by radio equipment comprising a recovered-carrier connection part connecting a peripheral apparatus to a recovered carrier recovered from a received signal.

According to the above-mentioned radio equipment, the recovered carrier in the radio equipment may easily be provided to the peripheral apparatus.

The object described above is also achieved by radio equipment for communicating digital data comprising: a clock oscillator generating a clock signal; an interference detection part detecting interference with a received signal; and a clock control part changing frequency of the clock signal so that the interference detected in the interference detection part decreases.

According to the above-mentioned radio equipment, as a result of changing the clock signal frequency, frequency of the harmonic of the clock signal may be identical to the received signal frequency. In this case, interference with the receiving circuit in the radio equipment due to the harmonic may be removed by demodulation using the offset control.

The object described above is also achieved by radio equipment for communicating digital data comprising: a timing clock oscillator generating a timing clock signal; a digital data generation part generating the digital data based on the timing clock signal; a transmission part transmitting a carrier modulated by the digital data; a reception part receiving a signal on a receiving channel; and an interference channel table storing receiving channels which are subjected to interference by harmonics of the timing clock signal and the digital data; wherein frequency of the timing clock signal is changed when one of the receiving channels stored in the interference channel table is used.

According to the above-mentioned radio equipment, the frequency of the timing clock signal is changed when one of the receiving channels stored in the interference channel table is used. Therefore, the harmonic of the timing clock signal is prevented from interfering with the receiving channel.

The object described above is also achieved by radio equipment having a reception part and a control part, the radio equipment comprising: a clock oscillator generating a clock signal in the control part; a phase shift part shifting the clock signal by 180 degrees; an adjustment part adjusting a level ratio of a 180-degree shifted clock signal to the clock signal; and an interference detection part detecting interference to a received signal in the reception part; wherein the level ratio is adjusted in the adjustment part so that a harmonic of the clock signal and a harmonic of the 180-degree shifted clock signal cancel each other and the interference is reduced.

According to the above-mentioned radio equipment, interference to the received signal due to the harmonic of the clock signal may be reduced.

Other objects and further features of the present invention will be apparent from the following detailed description when read in conjunction with the accompanying drawings.

BRIEF DESCRIPTION OF THE DRAWINGS

FIG. 1 shows a block diagram of typical digital radio equipment;

FIG. 3 shows a block diagram for explaining a first principle of digital radio equipment according to the present invention;

DESCRIPTION OF THE PREFERRED EMBODIMENTS

Figure 2A:
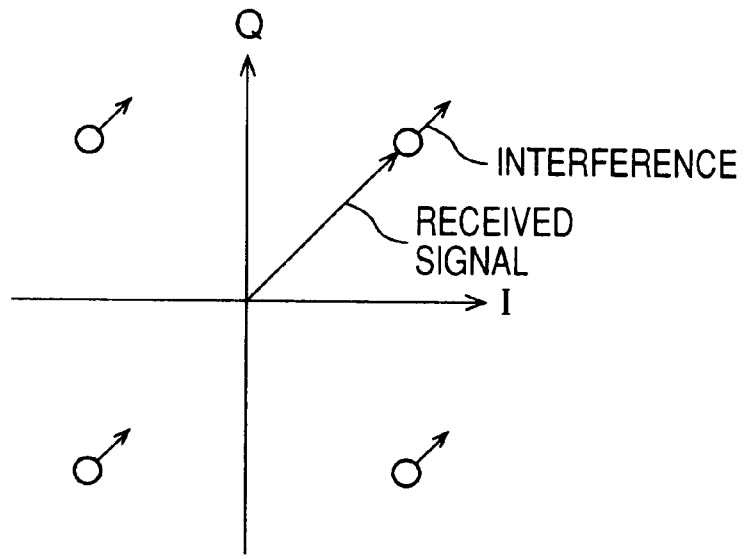
FIG. 2A and FIG. 2B show signal space diagrams when a QPSK signal is received with interference.
Figure 2B:
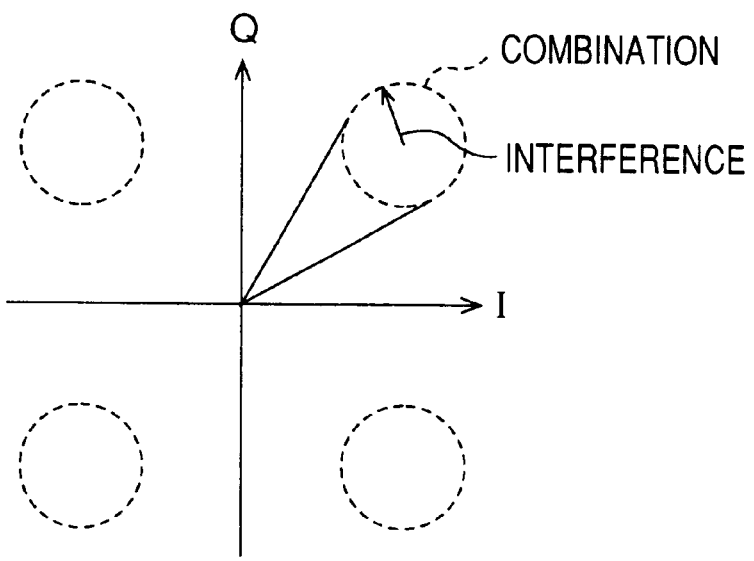

First, a description will be given of a first principle of digital radio equipment according to the present invention, by referring to FIG. 3 to FIGS. 5A, 5B. FIG. 3 shows a block diagram for explaining the first principle of the digital radio equipment according to the present invention.

Digital radio equipment 100 shown in FIG. 3 includes a transmission part and a reception part. The transmission part comprises a data processing circuit 2, a modulator 4, and a transmitting circuit 6. The reception part comprises a receiving circuit 8, a demodulator 10, and a data processing circuit 12. The data processing circuit 2 includes a speech CODEC 16 and a signal processing circuit 18. The data processing circuit 12 includes a signal processing circuit 20 and a speech CODEC 22.

The digital radio equipment 100 further comprises a variable frequency clock oscillator 60 for supplying a timing clock to the speech CODECs 16, 22, a variable frequency clock oscillator 62 for supplying a DSP clock to the signal processing circuits 18, 22, and a variable frequency clock oscillator 64 for supplying a CPU clock to the CPU 14. These clocks may be directly provided from clock sources included in the oscillators or may be provided through dividers.

The timing clocks provided to the speech CODECs 16, 22 determine a coding rate of a speech and a transmission rate of digital data. The DSP clocks provided to the signal processing circuits 18, 20 determine a signal processing speed. When the radio equipment 100 operates in a time division multiple (TDM) system, the signal processing circuits 18, 20 carry out a multiplying process and a time dividing process. Therefore, the DSP clocks may also determine the transmission rate of the digital data.

The digital radio equipment 100 further comprises an oscillator 66 whose output is used for frequency-modulating the timing clock, the DSP clock, and the CPU clock of the variable frequency clock oscillators 60, 62, 64.

In the following, an operation of the digital radio equipment 100 will be discussed. First, the respective clocks of the variable frequency clock oscillators 60, 62, 64 are frequency-modulated by the output of the oscillator 66. In the speech CODEC 16, based on the frequency-modulated timing clock produced in the variable frequency clock oscillator 60, a speech signal is converted to the digital data. Therefore, the digital data is also frequency-modulated data. In the signal processing circuit 18, the digital data is formatted in a form suitable for being transmitted. For example, when the radio equipment 100 operates in the TDM system, the digital data is distributed to TDM frames. When the modulation method is QPSK, the digital data is separated to an I (in-phase) channel signal and a Q (quadrature phase) channel signal.

In the modulator 4, by the digital data which has been processed in the signal processing circuit 18, a first local signal is digitally modulated. For the digital modulation, phase modulation such as QPSK and frequency modulation such as GMSK are usable. An output signal of the modulator 4 is converted to a radio signal by the transmitting circuit 6, and is transmitted through a filter 40 to an antenna 42.

A radio signal which has come through the antenna 42 and the filter 40 is received in the receiving circuit 8, and is converted to an intermediate frequency signal. The intermediate frequency signal is demodulated in the demodulator 10 to reproduce digital data at a baseband frequency. The reproduced digital data is processed to digital data including a timing clock for the speech CODEC 22 in the signal processing circuit 20, and is converted to a speech signal in the speech CODEC 22.

Figure 4A:
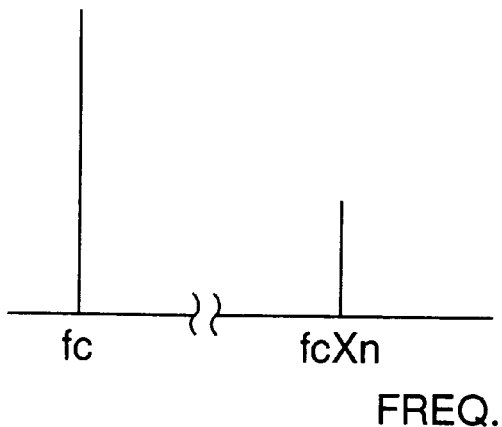
FIGS. 4A, 4B show spectra of a timing clock of a variable frequency clock oscillator of the digital radio equipment according to the present invention.
Figure 4B:
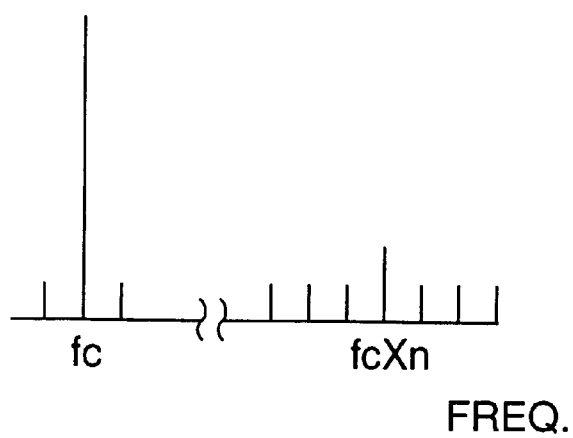
Figure 5A:
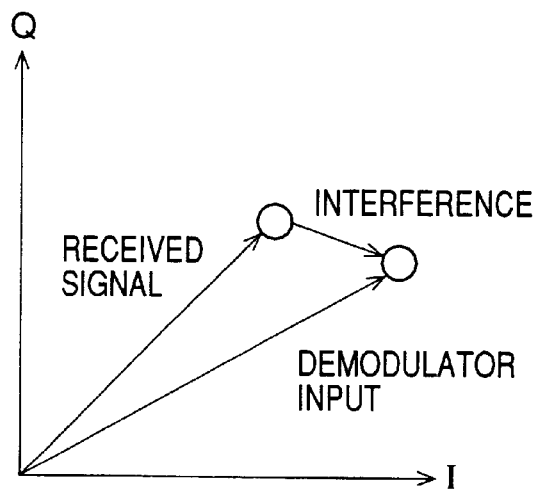
FIGS. 5A, 5B show signal space diagrams (only first quadrant) for a demodulated signal of the digital radio equipment according to the present invention.
Figure 5B:
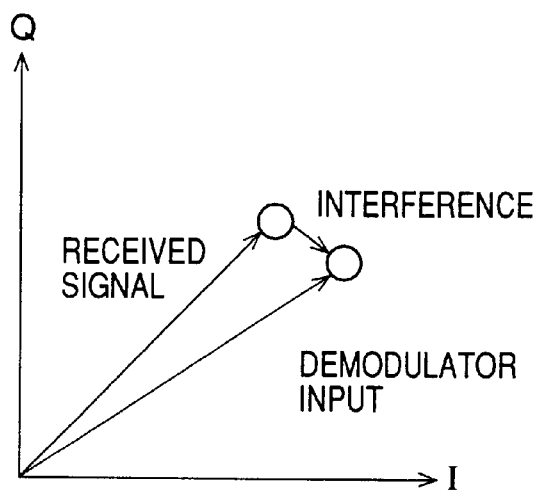

Next, a detail operation of the digital radio equipment 100 will be discussed by referring to FIGS. 4A, 4B, and FIGS. 5A, 5B. FIGS. 4A, 4B show spectra of the timing clock of the variable frequency clock oscillator 60 of the digital radio equipment according to the present invention. FIG. 4A shows a case in which the timing clock is not frequency-modulated, and FIG. 4B shows a case in which the timing clock is frequency-modulated. In those cases, a clock source included in the variable frequency clock oscillator 60 operates at $f_c$=2.688 MHz, and the timing clock frequency provided to the speech CODECs 16, 18 is set to 11.2 kHz. FIGS. 5A, 5B show signal space diagrams (only first quadrant) for a demodulated signal of the digital radio equipment according to the present invention. FIG. 5A shows the case where the timing clock is not frequency-modulated, and FIG. 5B shows the case where the timing clock is frequency-modulated.

In the case where the timing clock is not frequency-modulated, a large number of harmonics of the frequency $f_c$ are generated because the timing clock has rectangular shapes. For example, in a radio channel of 438.150 MHz, as shown in FIG. 4A, a 163-order harmonic is present in 438.144 MHz ($f_c \times 163$), close to the radio channel. When the harmonic is added as interference to the receiving circuit 8, as shown in FIG. 5A, an input signal provided to the demodulator 10 has a large deviation from an ideal signal point. Therefore, in this case, by small noise, an error may easily occur.

On the contrary, when the timing clock of the variable frequency clock oscillator 60 is frequency-modulated by the output signal (several kHz) of the oscillator 66 with a maximum frequency deviation of 1 kHz, the 163-order harmonic is frequency-modulated with a maximum frequency deviation of 163 kHz. Therefore, as shown in FIG. 4B, the frequency spectrum of the 163-order harmonic is widely spread, and the level of the 163-order harmonic is reduced. Accordingly, even when the level-reduced harmonic is added as interference to the receiving circuit 8, as shown in FIG. 5B, the deviation of the input signal provided to the demodulator 10 is reduced as compared to the case shown in FIG. 5A, and, thus, an error rate may also be reduced.

In this way, by frequency-modulating the clock for generating the digital data with only small frequency deviation, energy of the harmonic of the clock is spread to a frequency determined by multiplying the frequency deviation with the number of the order of the harmonic. Therefore, the levels of the harmonics are reduced. As a result, the level of the interference to a received radio signal may be reduced, and error rate performance may be improved. Also, by this advantage, data transmission rate and digital processing speed may be further increased.

It should be noted that in the radio equipment according to the present invention, the modulation method of the timing clock for generating the digital data is not limited to the frequency modulation, and various other angular modulation techniques including phase modulation are applicable.

Figure 6:
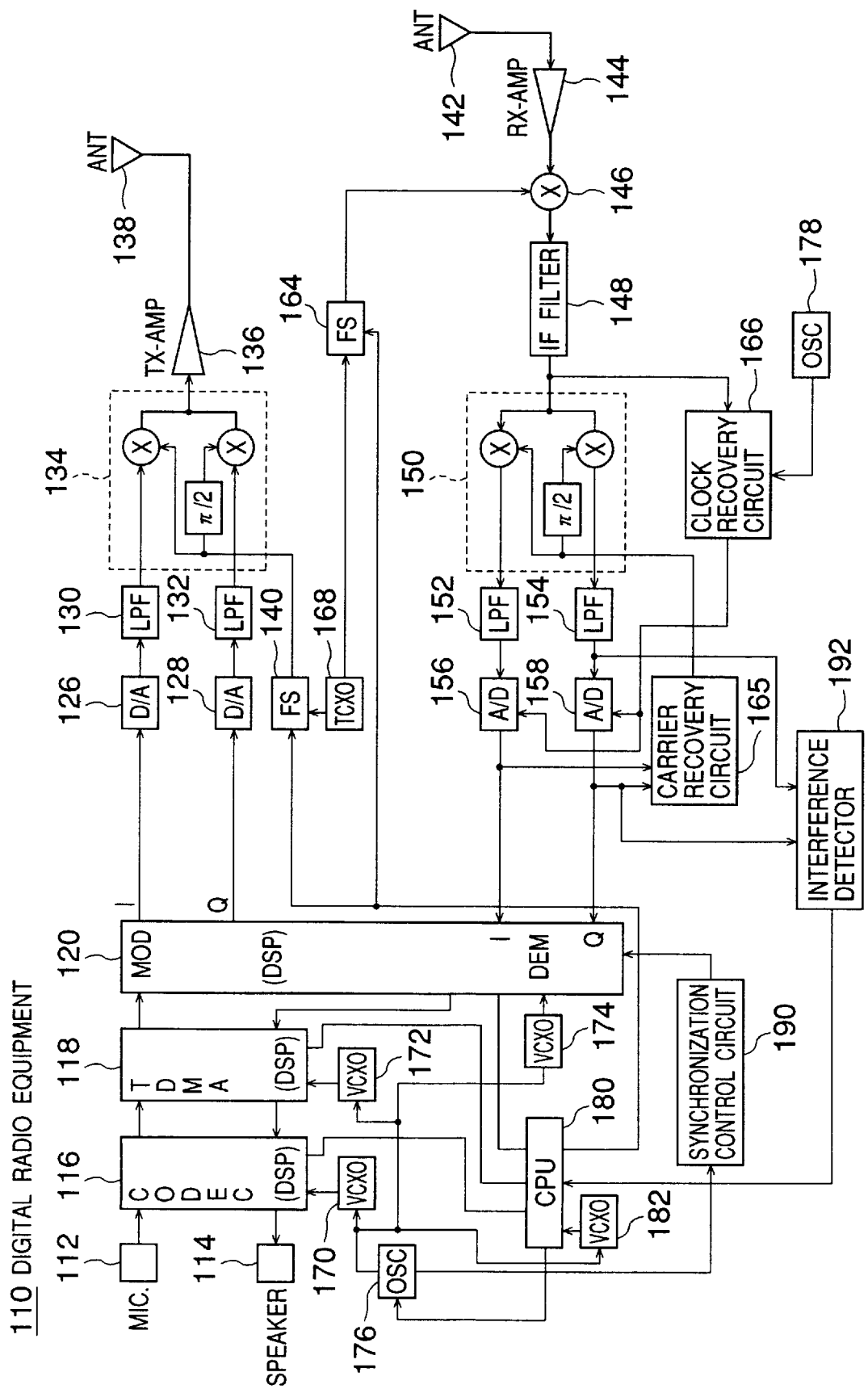
FIG. 6 shows a block diagram of a first embodiment of digital radio equipment according to the present invention.

Next, a description will be given of a first embodiment of the radio equipment according to the present invention, by referring to FIG. 6. FIG. 6 shows a block diagram of the first embodiment of the digital radio equipment according to the present invention. Digital radio equipment 110 is one example of radio equipment communicating digital speech signals in the QPSK modulation and a time division multiple access (TDMA) system. The digital radio equipment 110 is mainly constructed with a baseband processing part for processing the digital data, a transmission part for modulating the radio signal by the digital data and transmitting the modulated signal, and a reception part for receiving and demodulating the radio signal.

The baseband processing part includes a microphone 112, a speaker 114, CODEC 116, a TDMA processing circuit 118, and a modulation-and-demodulation processing circuit 120.

The transmission part includes digital-to-analog converters 126, 128, low pass filters 130, 132, a quadrature modulator 134, a transmit amplifier 136, and a transmit antenna 138. In the transmission part, a direct modulation method is used, and a transmission carrier of a frequency synthesizer 140 is directly modulated by the baseband signal. It is noted that in the radio equipment according to the present invention, a conventional transmission method including frequency conversion is also applicable.

The reception part includes a receive antenna 142, a receive amplifier 144, a mixer 146, an intermediate filter 148, a quadrature demodulator 150, low pass filters 152, 154, and analog-to-digital converters 156, 158. In the reception part, the received radio signal is mixed with a reception carrier of frequency synthesizer 164 in the mixer 146, and is converted to an intermediate frequency signal. Then, the intermediate frequency signal is demodulated. A demodulating section uses a coherent detection scheme, and includes a carrier recovery circuit 165 and a clock recovery circuit 166. The clock recovery circuit 166 is constructed such that the clock is directly recovered from the intermediate signal. However, a conventional clock recovery circuit where the clock is recovered from the detected signal is also usable. Further, the above-mentioned demodulating section may be constructed by also using a differential detection scheme.

Next, an operation of the digital radio equipment 110 will be discussed. The CODEC 116 codes the speech signal from the microphone 12 based on a timing clock provided from a voltage-controlled crystal oscillator (VCXO) 170, and decodes coded data to an analog speech signal to transmit to the speaker 114. The TDMA processing circuit 118 converts the speech coded data generated in th. CODEC 116 to digital data in a TDMA format and performs its reversal operation. These above-mentioned processes are carried out based on the DSP clock provided from the VCXO 172.

In the modulation-and-demodulation circuit 120, the digital data generated in the TDMA processing circuit 118 is converted to a format suitable for the QPSK modulation, and detected data provided from the demodulating section is converted to serial digital data for transmission to the TDMA processing circuit 118. The processes in the modulation-and-demodulation processing circuit 120 are carried out based on a DEMOD clock provided from the VCXO 174. The CPU 180 operates based on a CPU clock provided from the VCXO 182 and controls the above circuits.

As mentioned above, the CODEC 116, the TDMA processing circuit 118, and the modulation-and-demodulation processing circuit 120 are directly related to generation, transmission, reception, and reproduction of the digital data, and are specific for the digital modulation-and-demodulation method. These circuits may commonly be constructed with a digital signal processor (DSP).

In the digital radio equipment 110, the clocks, which are provided to the CODEC 116, the TDMA processing circuit 118, and the modulation-and-demodulation processing circuit 120, are frequency-modulated by a modulation signal of an oscillator 176. Therefore, in the same way, the digital data, which are generated or reproduced in the CODEC 116, the TDMA processing circuit 118, and the modulation-and-demodulation processing circuit 120, is also frequency-modulated. By the frequency modulation of the clocks, frequency spectrum of a harmonic generated in the clock for processing the digital data and frequency spectrum of a harmonic generated from a clock component included in the digital data are spread over a wide frequency range as disclosed in the description of the principle. Therefore, the levels of the harmonics are reduced, and also, the levels of the interference signals entering a receiving circuit such as a receive amplifier 144 and a mixer 146 are reduced. As a result, the level of the interference to the received radio signal may be reduced, and, thus, error rate performance may be improved.

In this embodiment, though the CPU 180 is not directly related to reception and data reproduction, the CPU clock provided to the CPU 180 may be frequency-modulated by the modulation signal of the oscillator 176. In this case, the spectrum of harmonics generated from the CPU clock of the VCXO 182 are spread and the interference due to the harmonics may be reduced.

Next, a method of reducing the interference generated in the clock recovery circuit 166 will be discussed. In the digital radio equipment 110, the timing clock for reproducing the baseband signal from the detected signal of the quadrature demodulator 150 is generated in the clock recovery circuit 166. Therefore, the clock recovery circuit 166 has a clock source for generating the timing clock. In fact, when harmonics generated from the recovered timing clock and an output of the clock source enter the receiving circuit, the harmonics may cause interference with the received radio signal. Since the demodulating section is located close to the receiving circuit, levels of the harmonics are relatively high.

Accordingly, in the digital radio equipment 110, the clock source in the clock recovery circuit 166 is also frequency-modulated by the modulation signal of an oscillator 178. In this case, it is possible to frequency-modulate only the recovered timing clock. By that frequency modulation, in the same way as mentioned before, interference due to high-order harmonics from the clock source and the recovered timing clock may be reduced.

In the digital radio equipment 110, the transmission part and the reception part are involved. However, the radio equipment according to the present invention may involve only one of the transmission part and the reception part.

Next, a method of reducing influence of the frequency modulation will be discussed. When the respective clocks of the baseband processing part are frequency-modulated, the digital data, which are generated or reproduced in CODEC 116, the TDMA processing circuit 118, and the modulation-and-demodulation circuit 120, are also frequency-modulated. As a result, the digital data has a transmission rate deviation. When the digital data thus modulated is transmitted through the modulating section and the transmit amplifier 136, a transmission spectrum may be distorted. Further, in radio equipment receiving the transmitted signal, receiving performance may be degraded.

Accordingly, in the digital radio equipment 110, to properly detect the frequency-modulated digital data in the reception part, a synchronization control circuit 190 is provided. From a transmission side of the radio signal, modulation information (frequency deviation and modulation frequency) of the digital data with the radio signal are transmitted to a reception side. In the reception side of the radio signal, by the synchronization control circuit 190, the demodulating process of the modulation-and-demodulation processing circuit 120 is carried out in synchronization with the modulation of the digital data. The synchronizing process may easily be performed by digital processing of the modulation-and-demodulation processing circuit 120.

Further, in the transmission side, a synchronization signal (synchronization word), which is synchronized with phase and frequency of an oscillator generating a modulation signal, is transmitted as data to the reception side, and in the reception side, the synchronization word is analyzed. Based on a result of the analysis, phase and frequency of an oscillator generating a modulation signal in the reception side are controlled. The synchronization may also be achieved by modulating the clock of the baseband processing part at the same time.

In the above-mentioned synchronizing method, even if the digital data involved in the received signal is frequency-modulated, an error due to the modulation may be prevented.

Next, conditions for performing the frequency modulation will be discussed.

A first condition is that the digital radio equipment 110 further comprises an interference detector 192 for detecting interference to the received signal. When one of the harmonics generated from the clocks in the baseband processing part and the clock recovery circuit 166 has a frequency close to the received radio signal, the harmonic can be detected as interference in the interference detector 192. In the digital radio equipment 110, when the interference is detected in the interference detector 192, the clocks of the baseband processing part and the clock recovery circuit 166 are frequency-modulated. On the other hand, when no interference is detected, the frequency modulation is not carried out. Therefore, when the harmonic frequency is spaced apart from the received radio signal and has no influence on detection in the receiving circuit, needless modulation may be prevented.

The interference detection can be conventionally performed by analyzing deviation of the received signal points in the signal space diagram. For example, a method of comparing an input of the decision circuit with an output thereof, which is disclosed in Japanese Laid-Open Patent Application No.56-6556, is usable. Further, by also analyzing fluctuation of a control voltage of a variable frequency oscillator of the carrier recovery circuit, the interference can be detected.

A second condition is that the CPU 180 in the digital radio equipment 110 has an interference channel table storing receive channels which may be subjected to interference by harmonics generated in the radio equipment. When one of the receive channels stored in the interference channel table is used, the clocks of the baseband processing part and the clock recovery circuit 166 are frequency-modulated. On the other hand, when no receive channel stored in the interference channel table is used, the frequency modulation is not carried out. Therefore, when the harmonic frequency is spaced apart from the received radio signal and has no influence on detection in the receiving circuit, needless modulation may be prevented.

A third condition is that in the digital radio equipment 110, only when the radio signal is received, the clocks of the baseband processing part and the clock recovery circuit 166 are frequency-modulated. On the other hand, when no radio signal is received, the frequency modulation is not carried out.

Figure 7:
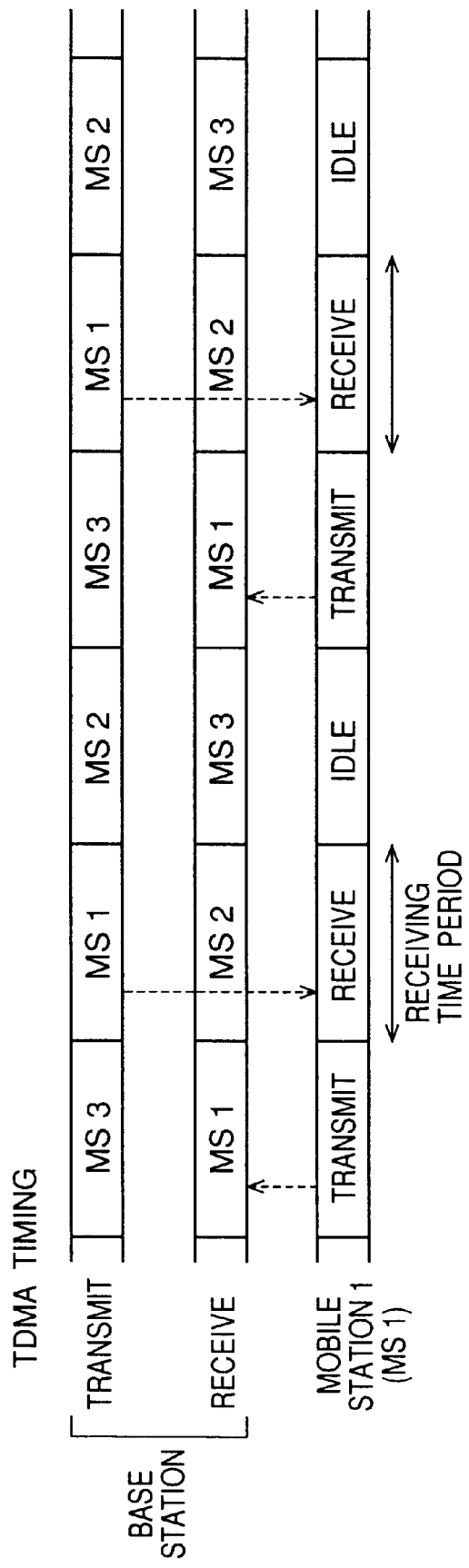
FIG. 7 shows an example of a TDMA frame format of a digital cellular communication system.

FIG. 7 shows an example of a TDMA frame format of a digital cellular communication system. In this system, when signals are successively transmitted from a base station to mobile stations MS3, MS1, MS2, signals from the mobile stations MS1, MS2, MS3 are received in the base station in that order. In the mobile station MS1, a transmission frame is not overlapped with a reception frame. An idle frame is used for hand-off sequence in the communication, etc. In this way, by frequency-modulating the clock only during the reception time period, the needless modulation may be prevented from being carried out when no radio signal is received.

Figure 8:
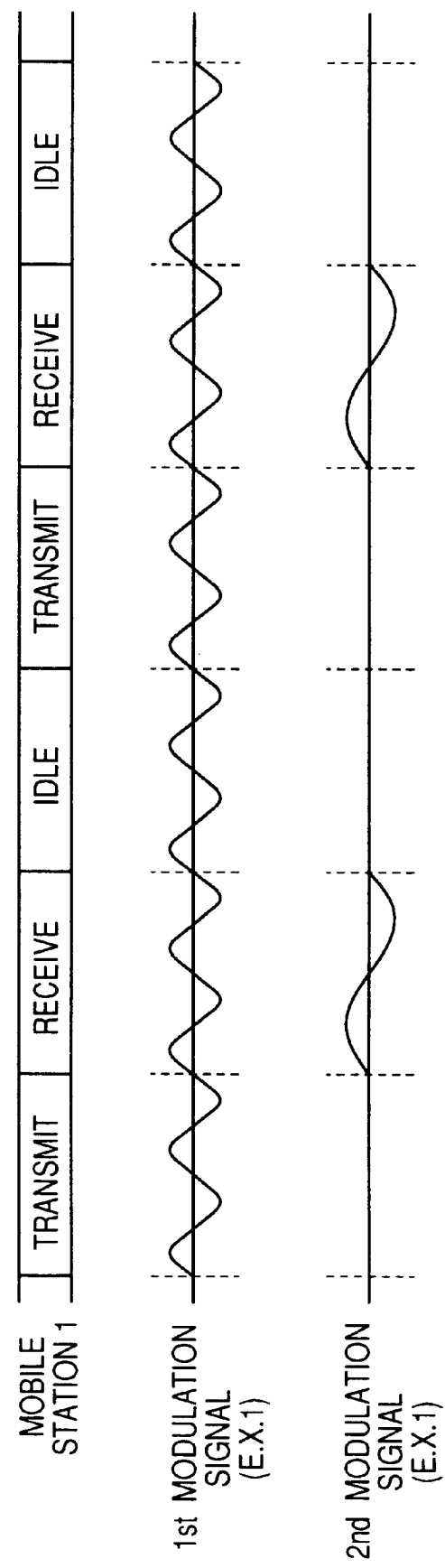
FIG. 8 shows a relationship between a TDMA frame of a mobile station 1 shown in FIG. 7 and modulation signals.

A fourth condition is that a time interval of the time division frame is given by integral multiples of a period of the modulation signal of the oscillator 176. FIG. 8 shows a relationship between the TDMA frame of the mobile station 1 shown in FIG. 7 and the modulation signals. In a first modulation signal, the time interval of one frame is given by twice the period of the modulation signal, and the clock is modulated over all frames. In a second modulation signal, the time interval of one frame is given by one time period of the modulation signal, and the clock is modulated only in the reception frames. In both examples, at start and end points of each frame, the deviation of the modulation is minimum, and, thus, the digital data has the conventional transmission rate at those points.

At the inside of the frame, a pair of strong modulation and weak modulation are repeated. Therefore, on an average over the frame, the transmission rate is considered to be substantially constant. Namely, by synchronizing the modulation signal for modulating the digital data with the TDMA frame, no portion of the digital data in the frame is out of the frame, and, thus, a transmission amount in the frame may be maintained. Therefore, influence due to the modulation of the digital data may be reduced.

Figure 9:
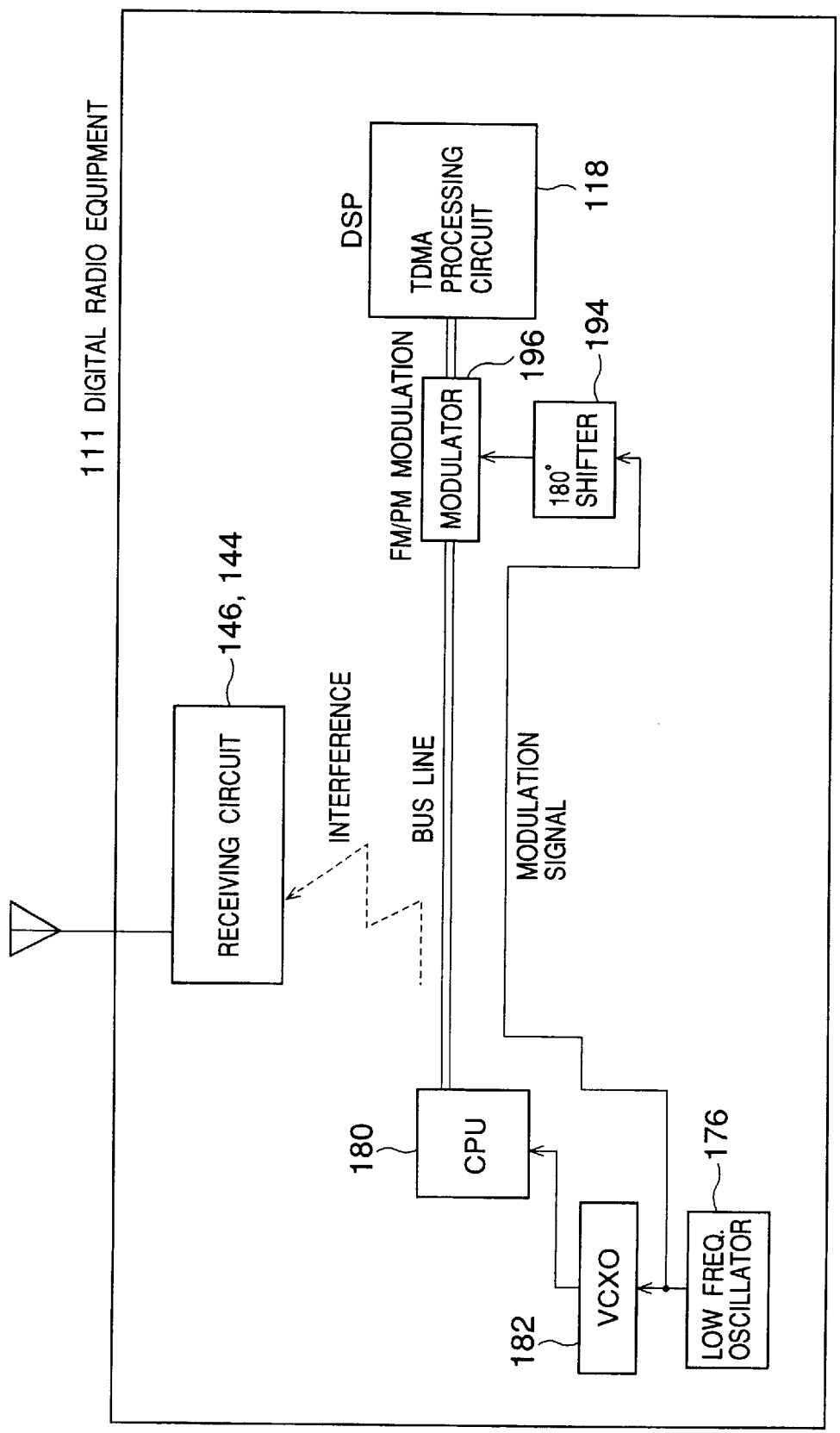
FIG. 9 shows a block diagram of a second embodiment of digital radio equipment according to the present invention.

Next, a description will be given of a second embodiment of the radio equipment according to the present invention, by referring to FIG. 9. FIG. 9 shows a block diagram of the second embodiment of the digital radio equipment according to the present invention. Digital radio equipment 111 has substantially the same configuration as that of the digital radio equipment 110 shown in FIG. 6. Therefore, the receiving circuit in the digital radio equipment 111 has the receive amplifier 144 and the receive mixer 146. The CPU 180 is operable based on the CPU clock which is frequency-modulated by the modulation signal of the low frequency oscillator 176. The data generated by the CPU clock is transmitted to the TDMA processing circuit 118 through the bus line. By frequency-modulating the CPU clock, the levels of the harmonics generated from the CPU clock may be reduced.

In the digital radio equipment 111, more specifically, in the side of the TDMA processing circuit 118, the data which has come from the CPU 180 through the bus line is re-modulated by a modulation signal which is given by shifting the modulation signal from the oscillator 176 by 180 degrees. By the re-modulation, the modulated component in the data may be cancelled, and, thus, the modulated component is prevented from having an influence on digital processing in the TDMA processing circuit 118. In conventional radio equipment, the frequency deviation of the modulation was given such that the modulation had no influence on the digital processing. However, in the digital radio equipment 111 according to the present invention, even if large frequency deviation is set to the modulation, the influence on the digital processing due to the modulation may be reduced. Therefore, the levels of the harmonics of the clocks may further be reduced as compared to the conventional radio equipment in which the clock in a control circuit is merely modulated.

Figure 10:
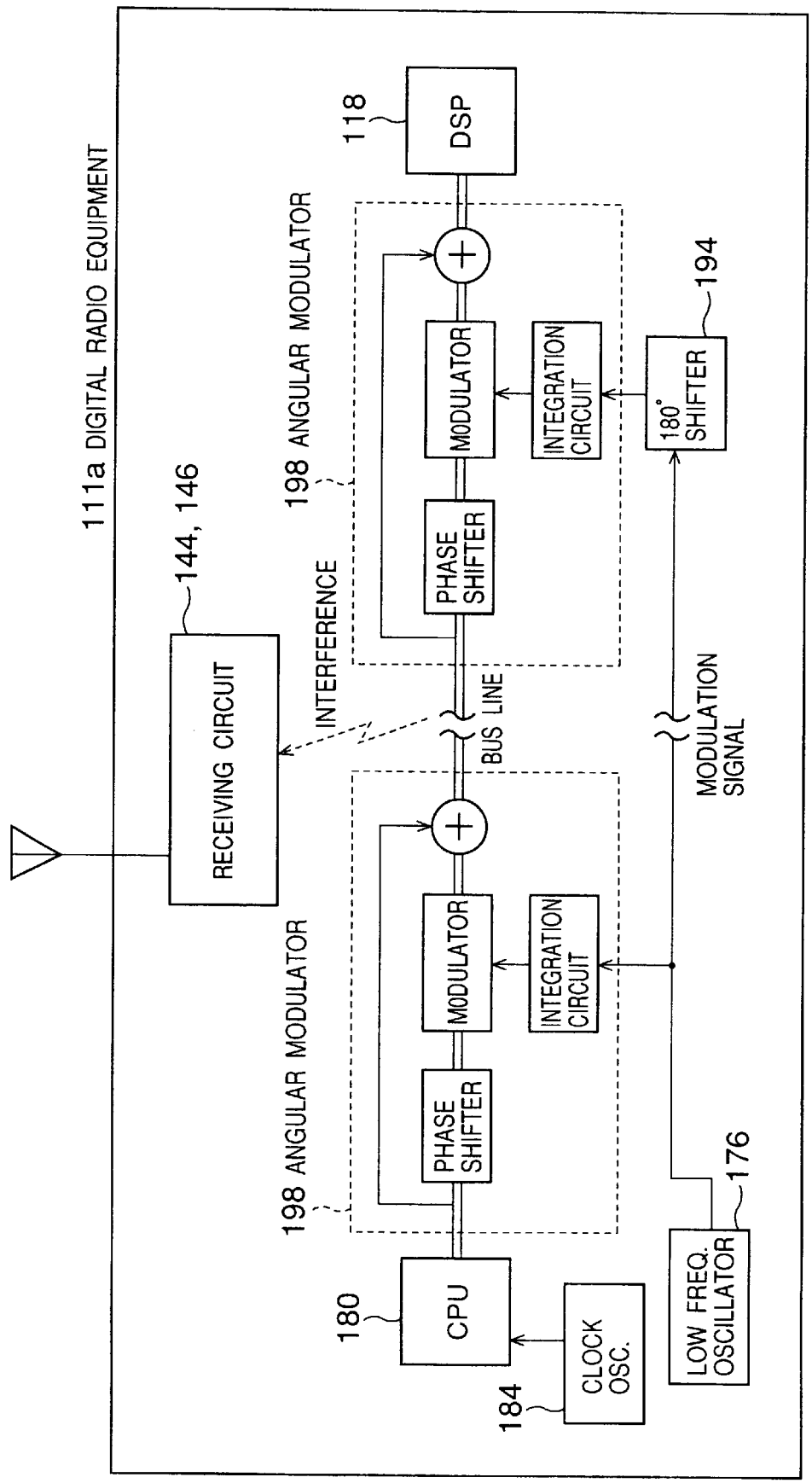
FIG. 10 shows an example of modifications of the digital radio equipment shown in FIG. 9.

FIG. 10 shows an example of modifications of the digital radio equipment 111 shown in FIG. 9. In digital radio equipment 111a, the data through the bus line, which is generated in the CPU 180, is directly modulated by an angular modulator 198. The angular modulator 198 is a well-known circuit such as an Armstrong modulator, and is constructed with a phase shifter, a modulator, an integration circuit for integrating the modulation signal, and a combiner.

From the angular modulator 198, angular-modulated CPU data is produced. By the angular modulation, the harmonics of the CPU data are spread.

Further, in a receiving side of the data, the angular-modulated CPU data transmitted from the CPU 180 is re-modulated by an angular modulator 196 having the same configuration as the transmission side modulator. At this time, when the CPU data is modulated by the modulation signal shifted by 180 degrees, the modulated signal in the CPU data is cancelled in the angular modulator 196. Therefore, also in the digital radio equipment 111a, large frequency deviation may be set to the modulation, and, thus, the levels of the harmonics of the clocks may be further reduced as compared to the conventional radio equipment in which the clock in the control circuit is merely modulated.

The modulator 196 shown in FIG. 9 may have the same configuration as that of the modulator 196 shown in FIG. 10.

Figure 11:
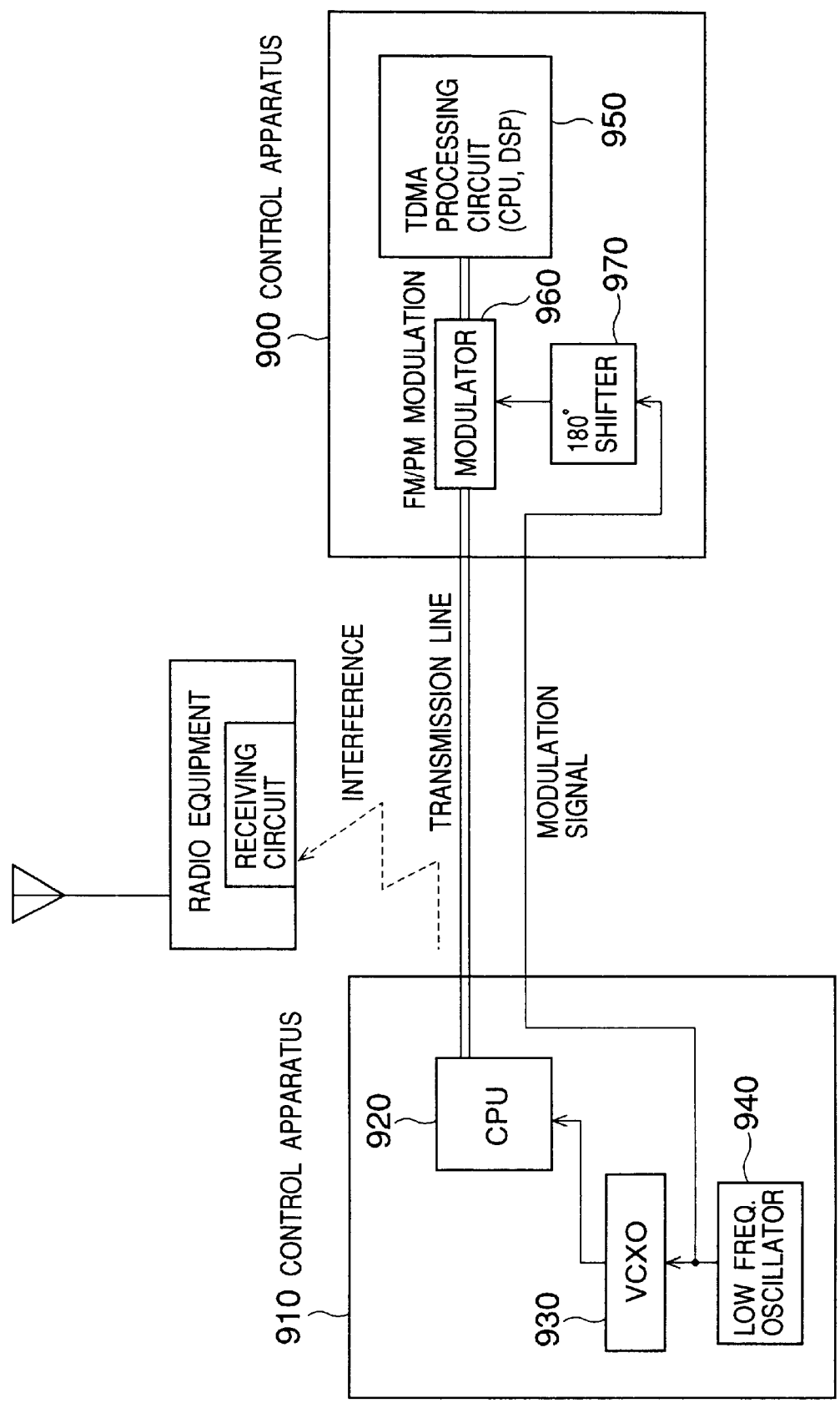
FIG. 11 shows a system involving a first embodiment of a control apparatus according to the present invention.

Next, a description will be given of a first embodiment of a control apparatus according to the present invention, by referring to FIG. 11. FIG. 11 shows a system involving the first embodiment of the control apparatus according to the present invention. A control apparatus 900 of the first embodiment is connected to another control apparatus 910 through a transmission line located close to the radio equipment. Such a control apparatus may be a computer. The radio equipment may be a radio telephone, and radio equipment in the base station. The control apparatus 910 includes CPU 920 which is operable based on a CPU clock of VCXO 930. The CPU clock in the VCXO 930 is modulated by a modulation signal of a low frequency oscillator 940. Therefore, the data produced from the CPU 920 in the control apparatus includes modulation components. The data is transmitted to CPU or DSP 950 in the control apparatus 900 through the transmission line.

The control apparatus 900 includes a 180-degree phase shifter 970 for shifting the modulation signal from the low frequency oscillator 940 in the control apparatus 910, and a modulator 960 for re-modulating the data passing through the transmission line. In the control apparatus 900, by the modulator 960, the frequency-modulated data transmitted through the transmission line is re-modulated by a modulation signal shifted by 180 degrees. By the re-modulation, the frequency-modulated components included in the data may be cancelled.

Therefore, in the system having the apparatus 900 according to the present invention, interference influence on the process of the control apparatus 900 may be reduced. Further, since large frequency deviation can be set to the modulation of the clock, the levels of the harmonics of the clocks may further be reduced as compared to the conventional apparatus in which the clock in the control circuit is merely modulated. Accordingly, the harmonics are prevented from having an influence on the receiving circuit of the radio equipment.

In the control apparatus 900 shown in FIG. 11, the modulator 960 and the 180-degree phase shifter 970 are not necessarily involved in the control apparatus 900, and may be individually constructed in connection with the control apparatus 900.

Further, in FIG. 11, the output data of the CPU 920 may be directly modulated in the same modulation method (Armstrong modulation) as that shown in FIG. 10. The modulator 960 shown in FIG. 11 may have the same configuration as that of the angular modulator 196 shown in FIG. 10.

Figure 12:
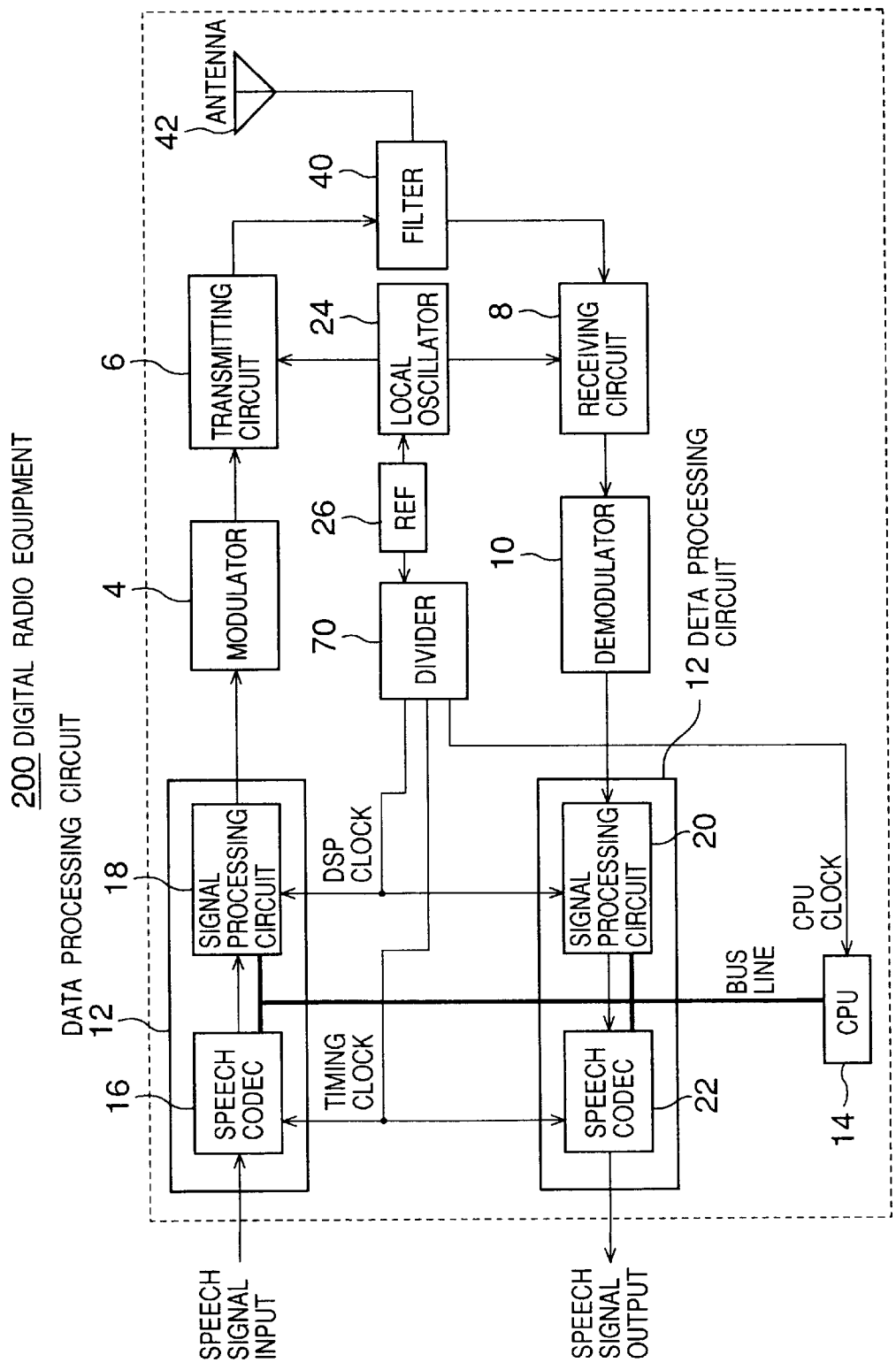
FIG. 12 shows a block diagram for explaining a second principle of the digital radio equipment according to the present invention.

Next, a description will be given of a second principle of the digital radio equipment according to the present invention, by referring to FIG. 12 and FIGS. 13A, 13B. FIG. 12 shows a block diagram for explaining the second principle of the digital radio equipment according to the present invention.

Digital radio equipment 200 shown in FIG. 12 has substantially the same configuration as that of the digital radio equipment 100 shown in FIG. 3. Elements in FIG. 12 which are the same as those of FIG. 3 are given the same reference numerals. In the digital radio equipment 200, a divider 70 is provided instead of the variable frequency clock oscillators 60, 62, 64 shown in FIG. 3. Clocks generated by dividing a reference signal of a reference oscillator 26 are provided as the timing clock, the DSP clock, and the CPU clock. Other circuit configuration and operation are the same as those of the digital radio equipment 100 shown in FIG. 3.

The reference signal of the reference oscillator 26 is conventionally used for stabilizing an oscillation frequency of the local oscillator 24. The local oscillator 24 is constructed with the frequency synthesizer using a phase-locked loop (PLL). The oscillation frequency of the frequency synthesizer is given by integral multiples of the frequency which is given by dividing the reference signal of the reference oscillator 26. The output signal of the local oscillator 24 is used as a carrier of the transmission radio signal and a carrier for receiving the radio signal.

In the digital radio equipment 200, when the signals given by dividing the reference signal of the reference oscillator 26 are used as the clocks for the data processing circuits 2, 12 and the CPU 14, the clock frequency is given by one-integral multiples of the carrier frequency of the received radio signal. In this configuration, the higher-order harmonic frequency of the clock may be adjusted to one of the carrier frequencies of the received radio signal.

For example, when frequency of the clock source (included in the divider 70) for the timing clock is set to 3.2 MHz and the reference oscillator 26 produces a 12.8-MHz reference signal, the output of the clock source may be given by dividing the reference signal by four. For a base signal of the frequency synthesizer, a 25-kHz signal given by dividing the reference signal by 512 is usable. In this case, a 137-order harmonic frequency of the 3.2-MHz clock source is 438.4 MHz, and this frequency is identical to one of carrier frequencies generated in the frequency synthesizer.

Figure 13A:
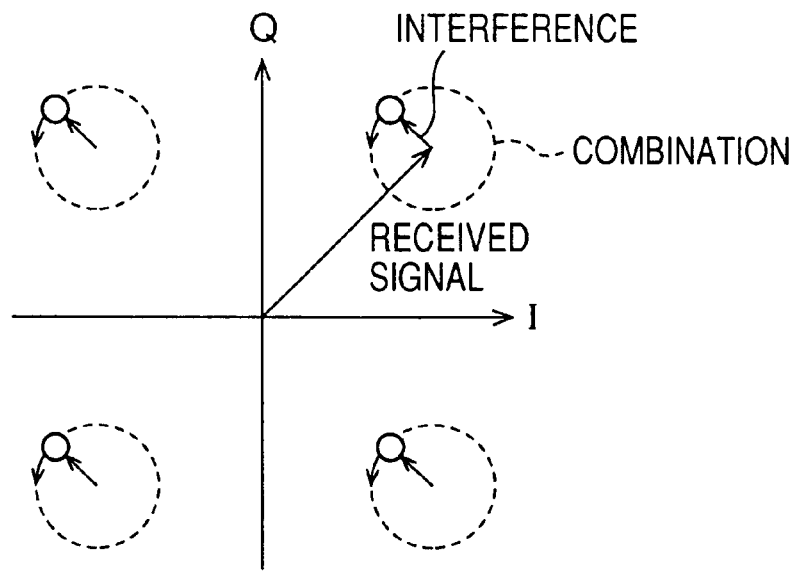
FIGS. 13A, 13B show signal space diagrams for explaining an effect when the frequency of interference is identical to frequency of a received signal.
Figure 13B:
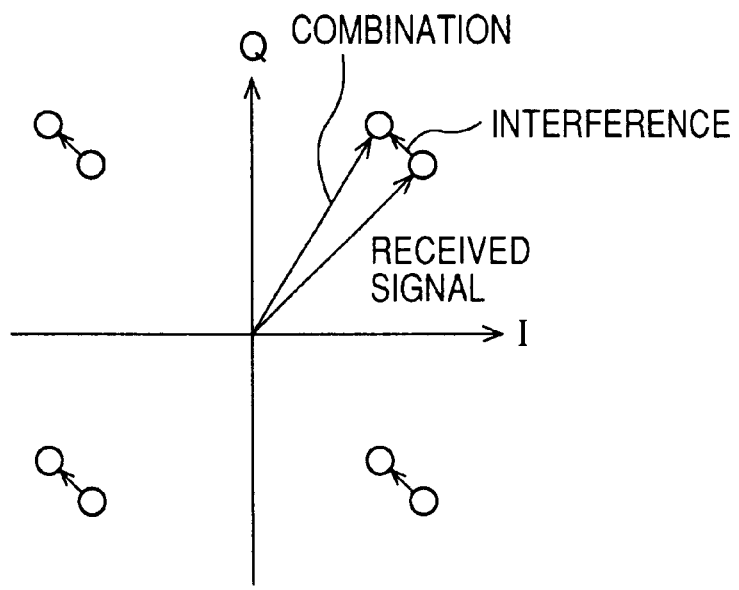

FIGS. 13A, 13B show signal space diagrams for explaining an effect when the frequency of the interference is identical to the received signal frequency. FIG. 13A shows a case where there is a frequency difference between the interference and the received signal, and FIG. 13B shows a case where there is no frequency difference between the interference and the received signal.

When there is a frequency difference between the interference and the received signal, as shown in FIG. 13A, a combined signal rotates about a signal point of the received signal. On the other hand, when there is no frequency difference between the interference and the received signal, as shown in FIG. 13B, the combined signal does not rotate about the signal point, but is merely phase shifted. In this case, for the QPSK modulation, four signal points are shifted in the same direction according to the level of the interference. Therefore, the received signal may be detected by shifting a phase of an input signal of the demodulator in the signal space diagram, or by shifting the decision level (for example, recovered carrier phases, namely I, Q axes). Namely, by adjusting the frequency of the interference to the frequency of the received signal, when the detection is carried out using the above-mentioned phase shifting method, the influence due to the interference may be reduced.

In the digital radio equipment 200 shown in FIG. 12, the reference signal of the reference oscillator 26 for the frequency synthesizer is used for the clocks provided to the data processing circuits 2, 12. In the equipment, another oscillator generating the same frequency signal may also be used.

The second embodiment of the radio equipment is useful when a high precision clock signal is required and the clock signal may not be deviated at frequency by the modulation. Also, the level of lower-order harmonics is not sufficiently spread by the modulation. Therefore, this embodiment is useful also when the level of the lower-order harmonics is relatively large.

Figure 14:
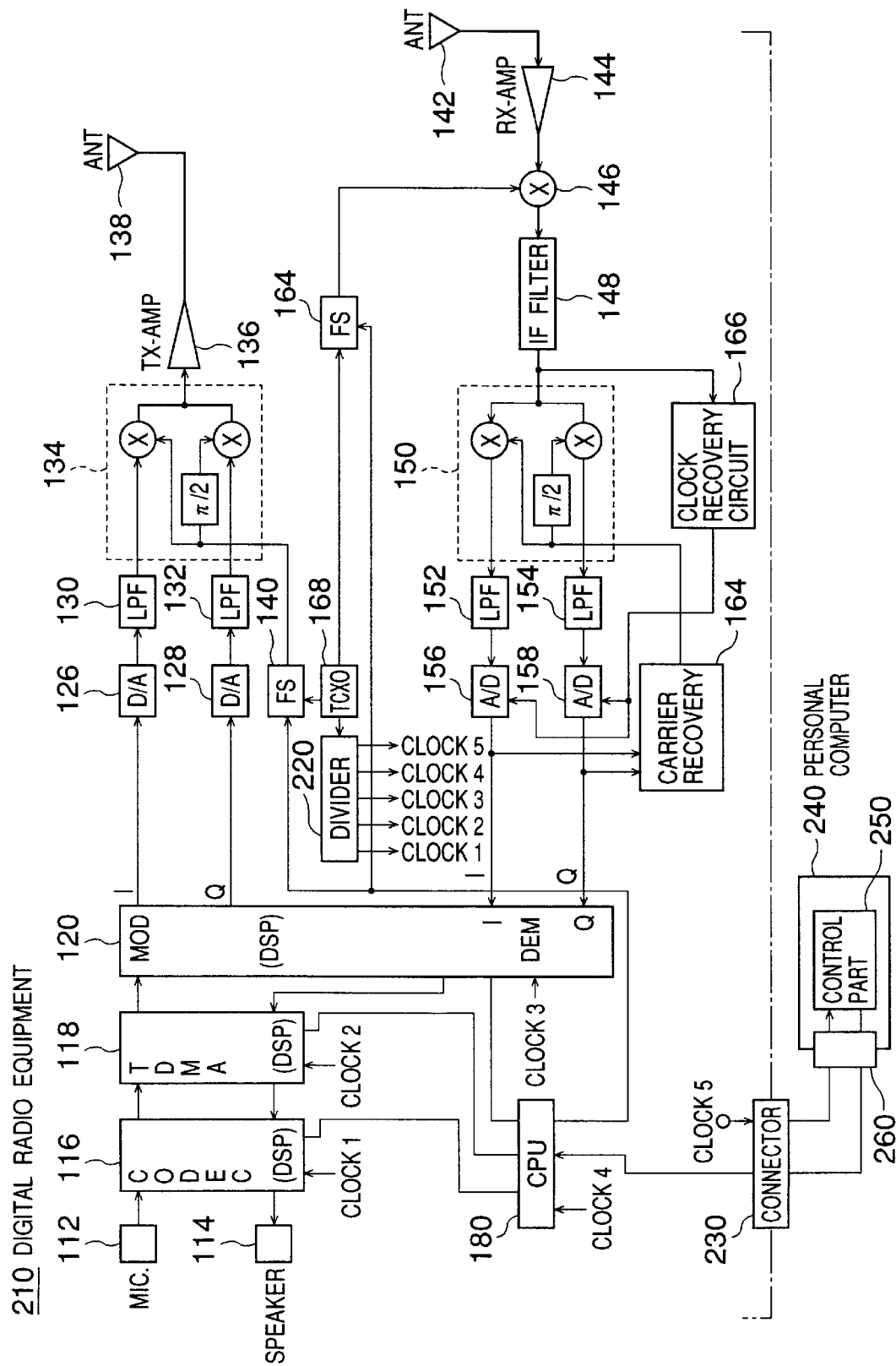
FIG. 14 shows a block diagram of a third embodiment of digital radio equipment according to the present invention.

Next, a description will be given of a third embodiment of the radio equipment according to the present invention, by referring to FIG. 14. FIG. 14 shows a block diagram of the third embodiment of the digital radio equipment according to the present invention. Digital radio equipment 210 has substantially the same configuration as that of the digital radio equipment 110 shown in FIG. 6. Therefore, elements in FIG. 12 which are the same as those of FIG. 6 are given the same reference numerals. The digital radio equipment 200 further comprises a divider 220 which is connected to a temperature compensation crystal oscillator (TCXO) 168 used as a reference oscillator of the frequency synthesizer 164. The divider 220 divides an output of the TCXO 168 and generates five clocks which are respectively provided to CODEC 116, the TDMA processing circuit 118, the modulation-and-demodulation processing circuit 120, the CPU 180, and an external output port of a connector 230.

In such a configuration, in the same principle mentioned before, frequency of the high-order harmonics of the clocks may be adjusted to one of the carriers which are generated in the frequency synthesizer 164. Therefore, when the received signal is detected by using the phase shifting method in the demodulating section, influence due to the interference may be reduced. The phase shifting method may be performed by, for example, shifting the phase of the recovered carrier of the carrier recovery circuit 165.

When through the digital radio equipment 210, data of a personal computer 240 is communicated with another computer connected to other radio equipment, harmonics generated from a clock source involved in a control part 250 of the personal computer 240 may interfere with the receiving circuit of the digital radio equipment 210. In this case, the clock 5 generated from the reference signal of the digital radio equipment 210 is provided as the clock source to the control part 250 of the personal computer 240 through the connector 230 and a connector 260.

In this way, the frequency of the harmonics generated in the control part 250 of the personal computer 240 may be adjusted to the received signal frequency. Therefore, in this configuration, in the same way mentioned before, interference due to the harmonics generated from the personal computer 240 located close to the digital radio equipment 210 may be prevented from having an influence on the receiving circuit of the digital ratio equipment 210.

Further, a signal of a reference oscillator involved in the peripheral apparatus such as a personal computer 240 can be provided within the digital radio equipment 210 and can be used as the signal of the TCXO 168. In this case, the same effect mentioned above may be obtained.

Figure 15:
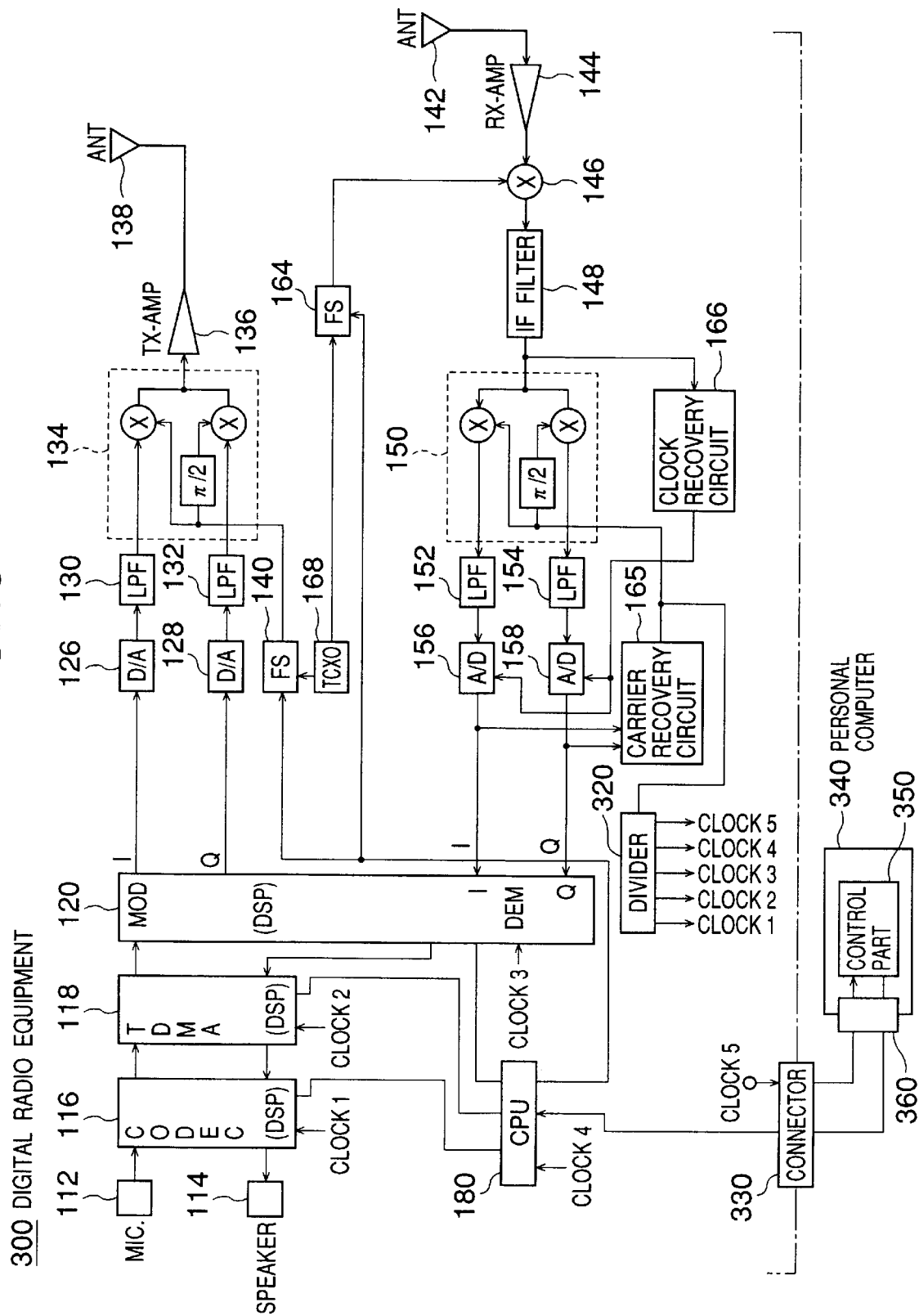
FIG. 15 shows a block diagram of a fourth embodiment of digital radio equipment according to the present invention.

Next, a description will be given of a fourth embodiment of the radio equipment according to the present invention, by referring to FIG. 15. FIG. 15 shows a block diagram of the fourth embodiment of the digital radio equipment according to the present invention. Digital radio equipment 300 has substantially the same configuration as that of the digital radio equipment 210 shown in FIG. 14. Therefore, elements in FIG. 15 which are the same as those of FIG. 14 are given the same reference numerals. The digital radio equipment 300 further comprises a divider 320 which is connected to the output of the carrier recovery circuit 165. The divider 320 divides the output of the carrier recovery circuit 165 and generates five clocks which are respectively provided to CODEC 116, the TDMA processing circuit 118, the modulation-and-demodulation processing circuit 120, the CPU 180, and an external output port of a connector 330.

A carrier recovered in the demodulating section in the coherent detection method gives a reference phase for detecting the received signal. Therefore, when a signal given by dividing the recovered carrier is used as the clock, frequency and phase of the clock harmonics may be identical to those of the recovered carrier. Therefore, when the received signal is detected by offsetting the interference due to the harmonic, interference influence may be reduced.

When through the digital radio equipment 300, data of a personal computer 340 is communicated with another computer connected to other radio equipment, harmonics generated from a clock source involved in a control part 350 of the personal computer 340 may interfere with the receiving circuit of the digital radio equipment 300. In this case, the clock 5 generated from the recovered carrier of the digital radio equipment 300 is provided as the clock source to the control part 350 of the personal computer 340 through the connector 330 and a connector 360.

In this way, the phase of the harmonics generated in the control part 350 of the personal computer 340 may be adjusted to the reference phase of the demodulating section. Therefore, in this configuration, in the same way mentioned before, the interference due to the harmonic generated from the personal computer 340 located close to the digital radio equipment 300 may be prevented from having an influence on the receiving circuit of the digital radio equipment 300.

Further, in the equipment, another oscillator generating a signal which has the same frequency as that of the recovered carrier may also be used to provide the signal to the divider 320. In this case, by the detection using the phase shifting method, influence due to the interference may be reduced. When the clock frequency in the peripheral apparatus such as personal computer 340 is set to the recovered carrier frequency in the radio equipment 300, the clock frequency can be provided to the digital radio equipment 300 and can be used as clocks for the internal circuits. In this case, the same effect mentioned above may be obtained.

Figure 16:
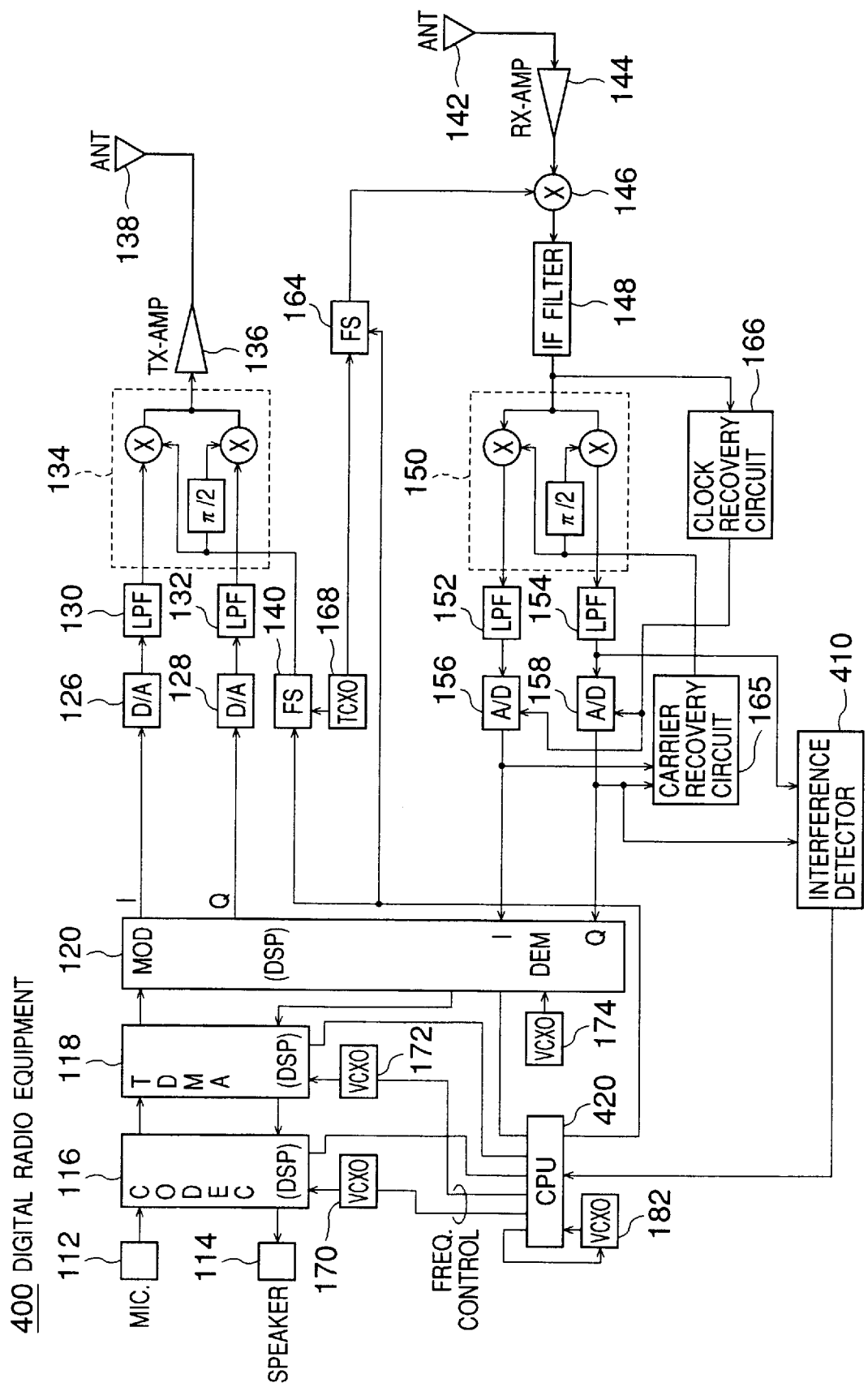
FIG. 16 shows a block diagram of a fifth embodiment of digital radio equipment according to the present invention.

Next, a description will be given of a fifth embodiment of the radio equipment according to the present invention, by referring to FIG. 16. FIG. 16 shows a block diagram of the fifth embodiment of the digital radio equipment according to the present invention. Digital radio equipment 400 has substantially the same configuration as that of the digital radio equipment 110 shown in FIG. 6. Therefore, elements in FIG. 16 which are the same as those of FIG. 6 are given the same reference numerals.

The digital radio equipment 400 further comprises an interference detector 410 detecting interference to the received signal. The interference detector 410 may have the same configuration as that of the interference detector 192 of the digital radio equipment 110. The digital radio equipment 400 has CPU 420 which receives an output of the interference detector 410 and controls frequencies of the variable frequency clock oscillators 170, 172, 174, and 182 so as to reduce the interference. In this case, the CPU 420 controls each clock frequency so as to phase synchronize the harmonic generated from the clock with the recovered carrier in the demodulating section.

In such a control, the harmonic of the clock may be adjusted to have the same frequency and phase of the recovered carrier. Therefore, if the detection is carried out so as to offset the interference due to the harmonic, the interference is prevented from having an influence on the receiving circuit.

Next, a description will be given of a third principle of the present invention.

Figure 17:
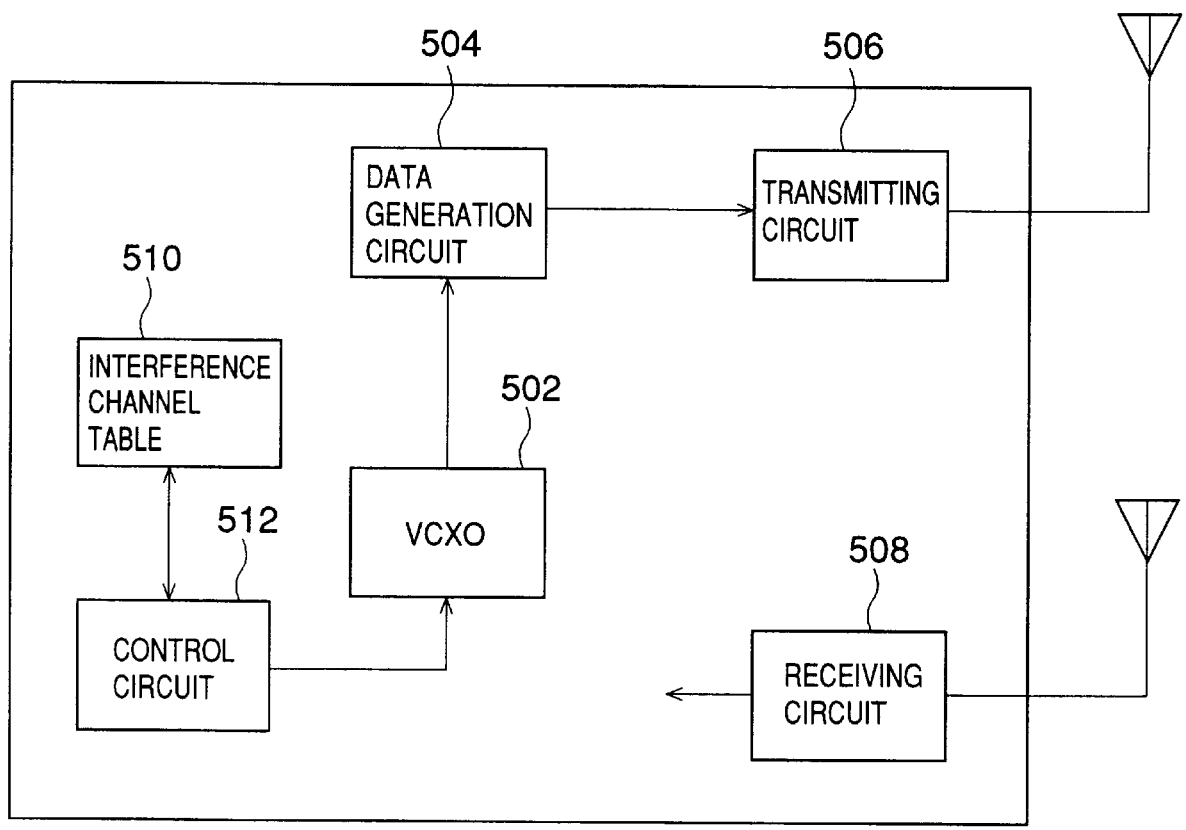
FIG. 17 shows a block diagram of a sixth embodiment of digital radio equipment according to the present invention

FIG. 17 shows a block diagram of a sixth embodiment of digital radio equipment according to the present invention. Digital radio equipment 500 has a variable frequency clock oscillator 502 as a timing clock oscillator, a data generation circuit 504 generating digital data based on the timing clock, a transmitting circuit 506 modulating a carrier by the digital data and transmitting the modulated signal, and a receiving circuit 508. The digital radio equipment 500 further comprises an interference channel table 510 for storing receiving channels which may be subjected to interference by harmonics of the timing clock and the digital data.

In the digital radio equipment 500, when a communication channel is established, the interference channel table 510 is referenced by the control circuit 512. When the receiving channel to be used is in the table 510, the control circuit 512 changes the clock frequency of the variable frequency clock oscillator 502 to a given frequency. At this time, a transmission rate is also changed by the change of the clock frequency, and the harmonic frequency changes. Therefore, interference due to the harmonic is prevented from having an influence on the receiving circuit 508.

In the above-mentioned operation, clock-frequency information is previously transmitted with the transmission data to an addressed party. Therefore, in the addressed party, the transmission data may be properly received without being influenced by the change of the transmission rate.

Figure 18:
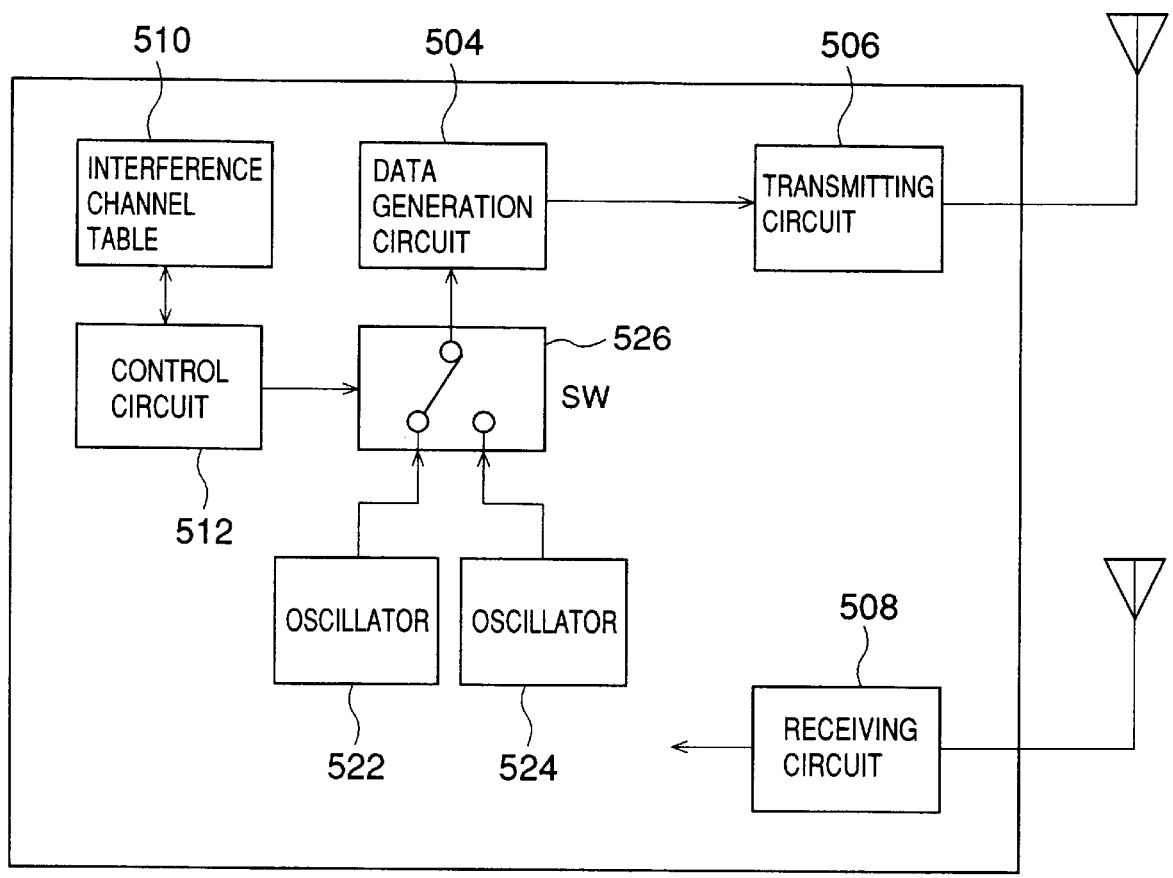
FIG. 18 shows a block diagram of a seventh embodiment of digital radio equipment according to the present invention.

FIG. 18 shows a block diagram of a seventh embodiment of digital radio equipment according to the present invention. Digital radio equipment 520 has substantially the same configuration as that of the digital radio equipment 510 shown in FIG. 17. The digital radio equipment 520 has a pair of oscillators 522, 524 whose clock frequencies are different from each other. Based on one of the clocks of the oscillators 522, 524, digital data is generated in the data generation circuit 504. The clock to be provided to the data generation circuit 504 is selected by a switch 526.

In an operation of the digital radio equipment 520, when a communication channel is established, the interference channel table 510 is referenced by the control circuit 512. When the receiving channel to be used is in the table 510, the control circuit 512 controls the switch 526 and selects the other oscillator. At this time, a transmission rate is changed by the switching of the oscillator, and the harmonic frequency changes. Therefore, interference due to the harmonic is prevented from having an influence on the receiving circuit 508.

In the above-mentioned operation, clock-frequency information is previously transmitted with the transmission data to an addressed party. Therefore, in the addressed party, the transmission data may be properly received without being influenced by the change of the transmission rate.

Next, a description will be given of a fourth principle of the present invention.

Figure 19:
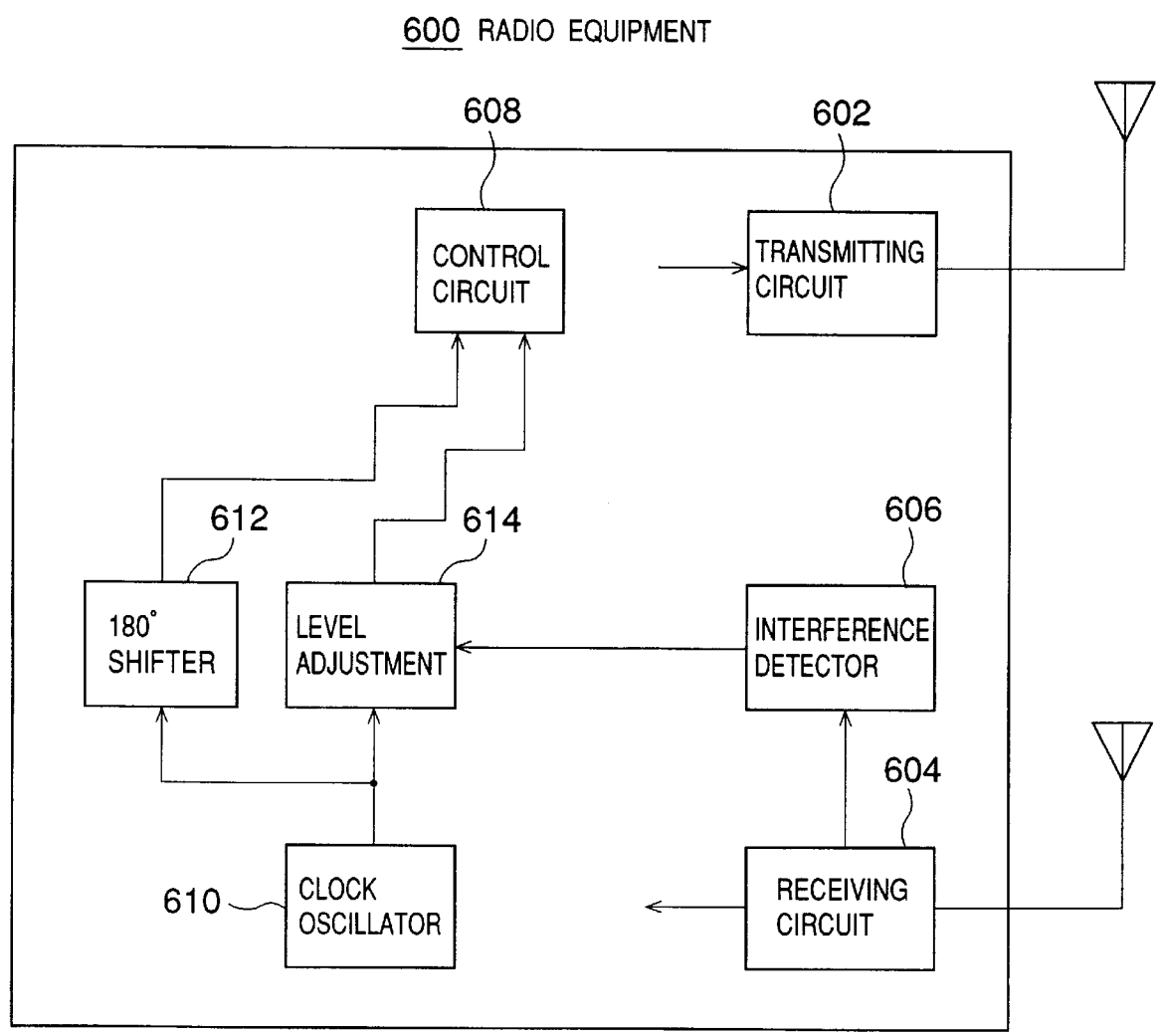
FIG. 19 shows a block diagram of an eighth embodiment of digital radio equipment according to the present invention.

FIG. 19 shows a block diagram of a eighth embodiment of radio equipment according to the present invention. Radio equipment 600 has a transmitting circuit 602 and a receiving circuit 604. The radio equipment 600 further has an interference detector 606 detecting interference to a received signal, and a control circuit 608. The control circuit 608 operates based on a clock of a clock oscillator 610. In the radio equipment 600, the clock of the clock oscillator 610 is distributed to two clocks, one being inverted by a 180-degree phase shifter 612, and the other being amplitude adjusted by a level adjustment circuit 614. The two clocks are provided to the control circuit 608 in parallel.

Harmonics of the clock of the clock oscillator 610 may have an influence on the receiving circuit 604 as interference. At this time, when the harmonics of the clock are combined with signals whose phases are opposite to those of the harmonics, the interference may be reduced. Further, by adjusting the amplitude of the harmonics and the signals, the interference further decreases. In the radio equipment 600, so as to reduce the interference detected in the interference detector 606, the amplitude of the clock of the clock oscillator 610 is adjusted in the level adjustment circuit 614. By this adjustment, the interference is prevented from having an effect on the receiving circuit 604.

In the above-mentioned operation, when a line passing the 180-degree shifted (inverted) clock is arranged close to an in-phase clock line in parallel, the amplitude of the two clocks may be substantially the same, and, thus, the harmonics of the two clocks may easily cancel each other. Further, in the radio equipment 600, though the 180-degree shifted clock is connected to the control circuit 608, the clock does not need to be used in the control circuit 608. Therefore, there is no need for connecting the line of the 180-degree shifted clock to the control circuit 608.

In the descriptions of the radio equipment according to the present invention, the angular modulation technology is not limited to frequency modulation as phase modulation technology is also usable.

Further, the present invention is not limited to these embodiments, but other variations and modifications may be made without departing from the scope of the present invention.

What is claimed is:

1. Radio equipment for receiving a radio signal modulated by angular-modulted digital data, said radio equipment comprising:

a reception part receiving said radio signal;

a demodulation part demodulating said radio signal in synchronication with frequency or phase variation of said angular-modulated digital data so as to produce digital data in which an angular modulation component is eliminated; and a clock modulator part for angle modulation of a clock signal, wherein said clock modulator part operates when the radio signal is received using a receiving channel subjected to interference by harmonics generated in the radio eqiupment.

2. A radio device including an encoder, a digital processor which digitizes an encoded signal from the encoder, and a modulator modulating a digital signal from the digital processor, said radio device comprising:

a first clock modulator performing an angular-modulating operation on a first clock signal to be supplied to the encoder;

a second clock modulator performing an angular-modulating operation on a second clock signal to be supplied to the digital processor; and a third clock modulator performing an angular-modulating operation on a third clock signal to be supplied to the modulator, wherein:

the encoder generates an angular-modulated encoded signal by using the first clock signal modulated by the first clock modulator;

the digital processor digitizes the angular-modulated encoded signal by using the second clock signal modulated by the second clock modulator; and the modulator modulates an angular-modulated digital signal by using the third clock signal modulated by the third clock modulator;

wherein the clock modulators operate when a radio signal is received using a receiving channel subjected to interference by harmonics generated in the radio device.

3. The radio device as claimed in claim 2, which further comprises:

said modulator for modulating a radio signal by the digitized angular-modulated signal from the digital processor; a transmitter for transmitting the radio signal modulated in said modulator.

4. The radio device as claimed in claim 2, which further comprises:

a reception part for receiving a radio signal; and a demodulator for demodulating said radio signal from the reception part and producing digital data.

5. The radio device as claimed in claim 2, which further comprises an interference detector for detecting interference to a received signal, and operation of said clock modulators is based on an output of said interference detection part.

6. The radio device as claimed in claim 2, which further comprises an interference channel table which stores receiving channels subjected to interference by harmonics generated in the radio equipment, and said clock modulators operate when one of said receiving channels stored in said interference channel table is used.

7. The radio device as claimed in claim 2, wherein said clock modulators operate during reception of a radio signal.

8. The radio device as claimed in claim 2, which further comprises a signal processor for communicating said digital signal by use of a time division frame given by integral multiples of a period of a given modulation signal for angular-modulation of the clock signal in said clock modulators.

9. A radio device including an encoder, a digital processor which digitizes an encoded signal from the encoder, and a modulator modulating a digital signal from the digital processor, said radio device comprising:

a receiver receiving a radio signal;

a demodulator demodulating the radio signal from the receiver and thus generating digital data;

a demodulator demodulating the radio signal from the receiver and thus generating digital data;

a clock recovery part generating, from the digital data, first, second and third clock signals to be respectively supplied to the encoder, the digital processor and the modulator;

a first clock modulator performing an angular-modulating operation on the second clock signal; and a second clock modulator performing an angular-modulating operation on the second clock signal; and a third clock modulator performing an angular-modulating operation on the third clock signal, wherein:

the encoder generates an angular-modulated encoded signal by using the first clock signal modulated by the first clock modulator;

the digital processor digitizes the angular-modulated encoded signal by using the second clock signal modulated by the second clock modulator; and the modulator modulates an angular-modulated digital signal by using the third clock signal modulator;

wherein the clock modulators operate when the radio signal is received using a receiving channel subjected to interference by harmonics generated in the radio device.

10. The radio device as claimed in claim 9, which further comprises an interference channel table which stores receiving channels subjected to interference by harmonics generated in the radio device, and said clock modulators operate when one of said receiving channels stores in said interference channel table is used.

11. A clock modulation module including an encoder, a digital processor which digitizes all encoded signal from the encoder, and a modulator modulating a digital signal from the digital processor, said radio device comprising:

a fist clock modulator performing an angular-modulating operation on a first clock signal to be supplied to the encoder;

a second clock modulator performing an angular-modulating operation on a second clock signal to be supplied to the digital processor; and a third clock modulator performing an angular-modulating operation on a third clock signal to be supplied to the modulator, wherein:

the encoder generates an angular-modulated encoded signal by using the first clock signal modulated by the first clock modulator;

the digital processor digitizes the angular-modulated encoded signal by using the second clock signal modulated by the second clock modulator; and the modulator modulates an angular-modulated digital signal by using the third clock signal modulated by the third clock modulator;

wherein the clock modulators operate when a radio signal is received using a receiving channel subjected to interference by harmonies generated the radio device.

12. The clock modulation module as claimed in claim 11, which further comprises an interference channel table which stores receiving channels subjected to interference by harmonics generated in the clock modulation module, and said clock modulators operate when one of said receiving channels stores in said interference channel table is used.

13. A radio equipment for communicating digital data comprising:

a clock modulation part for angular-modulation of a clock signal; and a data processing part processing said digital data based on said clock signal angular-modulated in said clock modulation part and producing angular-modulated digital data, information concerning the angular modulation being sent to another party with which the radio equipment communicates, wherein levels of harmonics generated from said clock signal and said digital data are reducible;

wherein the clock modulation part operates when a radio signal is received using a receiving channel subjected to interference by harmonics generated in the radio device.

14. The radio equipment as claimed in claim 13, which further comprises an interference channel table which stores receiving channels subjected to interference by harmonics generated in the radio equipment, and said clock modulation part operates when one of said receiving channels stores in said interference channel table is used.

15. A Radio equipment for communication digital data comprising:

a reception part receiving a radio signal;

a demodulation part demodulating said radio signal from the reception part and producing digital data;

a clock recovery part for recovering a recovered clock in relation to said digital data from said demodulation part; and a recovered-clock modulation part for angular-modulation of said recovered clock from the clock recovery part wherein levels of harmonics generated from said recovered clock signal and said clock recovery part are reducible;

wherein the recovered clock modulation part operate when the radio signal is received using a receiving channel subjected to interference by harmonics generated in the radio equipment.

16. The radio equipment as claimed in claim 15, which further comprises an interference channel table which stores receiving channels subjected to interference by harmonics generated in the radio equipment, and said recovered-clock modulation part operates when one of said receiving channels stores in said interference channel table is used.

17. A radio equipment for receiving a radio signal modulated by angular-modulated digital data, said radio equipment comprising:

a reception part receiving said radio signal and information concerning angular modulation;

a demodulation part demodulating said radio signal in synchronization with the information concerning the angular modulation so as to produce digital data in which an angular modulation component is eliminated; and a clock modulator part for angle modulation of a clock signal, wherein said clock modulator part operates when the radio signal is received using a receiving channel subjected to interference by harmonics generated in the radio equipment.

18. The radio equipment as claimed in claim 17, which further comprises an interference channel table which stores receiving channels subjected to interference by harmonics generated in the radio equipment, and said clock modulator part operates when one of said receiving channels stores in said interference channel table is used.

19. A radio device for communicating digital data comprising:

a clock modulation part for angular-modulation of a clock signal; and a data processing part processing said digital data based on said clock signal angular-modulated in said clock modulation part and producing angular-modulated digital data; and wherein levels of harmonics generated from said clock signal and said digital data are reducible;

wherein the clock modulation part operates when a radio signal is received using a receiving channel subjected to interference by harmonics in the radio device.

* * * * *